United States Patent
Silver et al.

(10) Patent No.: US 10,851,003 B2
(45) Date of Patent: Dec. 1, 2020

(54) DENITRIFICATION AND PH CONTROL USING BIO-ELECTROCHEMICAL SYSTEMS

(76) Inventors: Matthew Silver, Cambridge, MA (US);
Justin Buck, Cambridge, MA (US);
Patrick Kiely, Brighton, MA (US);
Juan J. Guzman, Medford, MA (US);
Zhen Huang, Waltham, MA (US)

( * ) Notice: Subject to any disclaimer, the term of this patent is extended or adjusted under 35 U.S.C. 154(b) by 494 days.

(21) Appl. No.: 13/811,149

(22) PCT Filed: Jul. 21, 2011

(86) PCT No.: PCT/US2011/044872
§ 371 (c)(1),
(2), (4) Date: Jan. 18, 2013

(87) PCT Pub. No.: WO2012/012647
PCT Pub. Date: Jan. 26, 2012

(65) Prior Publication Data
US 2013/0112601 A1   May 9, 2013

Related U.S. Application Data

(60) Provisional application No. 61/366,271, filed on Jul. 21, 2010, provisional application No. 61/496,603, filed on Jun. 14, 2011.

(51) Int. Cl.
*C02F 3/02* (2006.01)
*A01K 63/04* (2006.01)
(Continued)

(52) U.S. Cl.
CPC .............. *C02F 3/025* (2013.01); *A01K 63/04* (2013.01); *C02F 3/005* (2013.01); *C02F 3/302* (2013.01);
(Continued)

(58) Field of Classification Search
CPC ....................................................... C02F 3/005
See application file for complete search history.

(56) References Cited

U.S. PATENT DOCUMENTS

| 4,090,940 A | 5/1978 | Switzgable |
| 4,388,162 A | 6/1983 | Sammells et al. |

(Continued)

FOREIGN PATENT DOCUMENTS

| CN | 101849180 A | 9/2010 |
| EP | 573226 A1 | 12/1993 |

(Continued)

OTHER PUBLICATIONS

Wang et al., "Accelerated start-up of two-chambered microbial fuel cells: Effect of anodic positive poised potential", Electrochimica Acta 54, 2009, pp. 1109-1114, Available online Aug. 12, 2008, 6 total pages.*

(Continued)

*Primary Examiner* — Jonathan M Peo
(74) *Attorney, Agent, or Firm* — Capitol Patent & Trademark Law Firm, PLLC

(57) ABSTRACT

In one aspect, the present invention provides reactor designs, component designs, and operating schemes for removing nitrates and chemical oxygen demand from any suitable wastewater stream. In another aspect, the invention also provides reactor designs, component designs, and operating schemes designed to modify and improve pH and water quality in wastewater streams.

15 Claims, 9 Drawing Sheets

(51) Int. Cl.
*C02F 3/00* (2006.01)
*C02F 3/30* (2006.01)

(52) U.S. Cl.
CPC .......... C02F 2201/007 (2013.01); C02F 2201/46115 (2013.01); C02F 2201/46135 (2013.01); C02F 2209/08 (2013.01); C02F 2209/14 (2013.01); C02F 2209/15 (2013.01)

(56) References Cited

U.S. PATENT DOCUMENTS

| | | | |
|---|---|---|---|
| 8,440,438 | B2 | 5/2013 | Cheng et al. |
| 2001/0003276 | A1 | 6/2001 | De Souza et al. |
| 2002/0134674 | A1 | 9/2002 | Andrews et al. |
| 2002/0148722 | A1* | 10/2002 | Hermann ............ C02F 1/46104 204/242 |
| 2004/0045885 | A1 | 3/2004 | Hiro et al. |
| 2005/0164331 | A1* | 7/2005 | Kim ................ G01N 33/1866 435/29 |
| 2005/0183964 | A1 | 8/2005 | Roberts et al. |
| 2005/0255345 | A1 | 11/2005 | Gerritse et al. |
| 2006/0011491 | A1 | 1/2006 | Logan et al. |
| 2006/0063043 | A1 | 3/2006 | Zeikus et al. |
| 2007/0017877 | A1 | 1/2007 | Musson |
| 2007/0048577 | A1* | 3/2007 | Ringeisen .......... H01M 8/0232 429/401 |
| 2007/0259217 | A1 | 11/2007 | Logan |
| 2008/0277273 | A1 | 11/2008 | Logan |
| 2008/0292912 | A1* | 11/2008 | Logan ................ H01M 4/8878 429/2 |
| 2009/0130734 | A1 | 5/2009 | Mets |
| 2009/0142627 | A1* | 6/2009 | Shimomura .............. C02F 3/30 429/2 |
| 2009/0166208 | A1 | 7/2009 | Dong |
| 2009/0294353 | A1 | 12/2009 | Massie |
| 2009/0317882 | A1 | 12/2009 | Cheng et al. |
| 2010/0270158 | A1 | 10/2010 | Logan |
| 2011/0165667 | A1 | 7/2011 | Mets |
| 2011/0183159 | A1 | 7/2011 | He et al. |
| 2011/0315561 | A1* | 12/2011 | Rabaey ................ C02F 1/4618 205/615 |
| 2012/0132521 | A1 | 5/2012 | Silver et al. |
| 2013/0319940 | A1 | 12/2013 | Josse et al. |

FOREIGN PATENT DOCUMENTS

| | | | | |
|---|---|---|---|---|
| JP | 08-138978 | | 5/1996 | |
| JP | H09-155388 | A | 6/1997 | |
| JP | H10-230293 | A | 9/1998 | |
| JP | 11-010184 | | 1/1999 | |
| JP | H11-047793 | | 2/1999 | |
| JP | H11-216496 | A | 8/1999 | |
| JP | H11-253993 | A | 9/1999 | |
| JP | 2000-051894 | A | 2/2000 | |
| JP | 2000-126794 | A | 5/2000 | |
| JP | 2000-157995 | A | 6/2000 | |
| JP | 2001-145896 | A | 5/2001 | |
| JP | 2002-086189 | A | 3/2002 | |
| JP | 2002-520032 | A | 7/2002 | |
| JP | 2003-071453 | A | 3/2003 | |
| JP | 2005-125172 | A | 5/2005 | |
| JP | 2006-035158 | A | 2/2006 | |
| JP | 2006-159112 | A | 6/2006 | |
| JP | 2007-117995 | A | 5/2007 | |
| JP | 2007-227216 | A | 9/2007 | |
| JP | 2008-114191 | A | 5/2008 | |
| KR | 10-0810718 | B1 | 3/2008 | |
| WO | WO-0003447 | A1 | 1/2000 | |
| WO | WO-0104061 | A1 | 1/2001 | |
| WO | WO 2004004036 | A2 * | 1/2004 | ............ H01M 8/00 |
| WO | WO-2008036347 | A2 * | 3/2008 | ......... H01M 4/8605 |
| WO | WO-2008059331 | A2 | 5/2008 | |
| WO | WO-2008109911 | A1 | 9/2008 | |
| WO | WO 2008109911 | A1 * | 9/2008 | ............ H01M 8/16 |
| WO | WO-2008109962 | A1 | 9/2008 | |
| WO | WO-09042631 | A2 | 4/2009 | |
| WO | WO 2009046417 | A1 * | 4/2009 | ............ C02F 3/005 |
| WO | WO-2009072887 | A1 | 6/2009 | |
| WO | WO-2009131452 | A1 | 10/2009 | |
| WO | WO-2009140428 | A1 | 11/2009 | |
| WO | WO-2009155587 | A2 | 12/2009 | |
| WO | WO-2010044983 | A2 | 4/2010 | |
| WO | WO-2010062724 | A2 * | 6/2010 | ......... G05B 19/4185 |
| WO | WO-20100147683 | A1 | 12/2010 | |
| WO | WO-2011000084 | A1 | 1/2011 | |
| WO | WO-2011003081 | A1 | 1/2011 | |
| WO | WO-2012011984 | A1 | 1/2012 | |

OTHER PUBLICATIONS

Aelterman et al., "Continuous Electricity Generation at High Voltages and Currents Using Stacked Microbial Fuel Cells", Environ. Sci. Technol., 2006, 40, 3388-3394.*

Shimoyama et al., "Electricity generation from model organic wastewater in a cassette-electrode microbial fuel cell", Appl. Microbiol. Biotechnol., 2008, 80: 325-330.*

Dekker et al., "Analysis and Improvement of a Scaled-Up and Stacked Microbial Fuel Cell", Environ. Sci. Technol., 43, pp. 9038-9042, 2009, 5 total pages.*

Arnold, et al., "Regulation of Dissimilatory Fe(III) Reduction Activity in Shewanella putrefaciens," *App and Env Microbiol*, vol. 56, No. 9, pp. 2811-2817 (Sep. 1990).

Beliaev, et al., "Global transcriptome analysis of Shewanella oneidensis MR-1 exposed to different terminal electron acceptors," *J Bacteriol*, vol. 187, No. 20, pp. 7138-7145 (Oct. 2005).

Bendikov, et al., "Development and Environmental Application of a Nitrate Selective Microsensor Based on Doped Polypyrrole Films," Sensors and Actuators, vol. 106, No. 2, pp. 512-517 (May 13, 2005).

Bergel, et al., "Catalysis of Oxygen Reduction in PEM Fuel Cell by Seawater Biofilm." Electrochem. Commun., vol. 7(9), pp. 900-904 (2005).

Biffinger, et al., "A Biofilm Enhanced Miniature Microbial Fuel Cell Using Shewanella Oneidensis DSP10 and Oxygen Reduction Cathodes," *Biosensors and Bioelectronics*, vol. 22, pp. 1672-1679 (2007).

Bourgeois, et al., "On-Line Monitoring of Wastewater Quality: A Review," *Journal of Chemical Technology & Biotechnology*, vol. 76, pp. 337-348 (2001).

Bretschger, et al., "Current Production and Metal Oxide Reduction by Shewanella oneidensis MR-1 Wild Type and Mutants," *App and Env Microbiol*, vol. 73, No. 21, pp. 7003-7012 (2007), including "Erratum," *App and Env Microbiol*, vol. 74, No. 2, pp. 553 (2008).

Call, D. and Logan, B. E., "Hydrogen production in a single chamber microbial electrolysis cell lacking a membrane," Environ. Sci. Technol., vol. 42, pp. 3401-3406 (2008).

Chang, et al , "Continuous determination of biochemical oxygen demand using microbial fuel cell type biosensor," *Biosensors and Bioelectronics*, vol. 19, pp. 607-613 (2004).

Chang, et al., "Improvement of a microbial fuel cell performance as a BOD sensor using respiratory inhibitors," *Biosensors and Bioelectronics*, vol. 20, pp. 1856-1859 (2005).

Cheng, et al., "Direct Biological Conversion of Electrical Current into Methane by Electromethanogenesis," Environmental Science and Technology, American Chemical Society, vol. 43, No. 10, pp. 3953-3958 (Mar. 26, 2009).

Cheng, et al., "Increased Performance of Single-Chamber Microbial Fuel Cells Using an Improved Cathode Structure," Electrochemistry Communications, vol. 8, No. 3, pp. 489-494 (Mar. 2006).

Cheng, S. and Logan, B., "Sustainable and Efficient Biohydrogen Production via Electrohydrogenesis," PNAS, vol. 104, No. 47, pp. 18871-18873 (2007).

Clauwaert, et al., "Open Air Biocathode Enables Effective Electricity Generation with Microbial Fuel Cells," Environmental Science & Technology, vol. 41, No. 21, vol. 7564-7569 (Nov. 2007).

Clesceri, et al., Standard Methods for the Examination of Water and Wastewater. 20th Edition, APHA, Washington DC (1999) 733 pgs.

(56) References Cited

OTHER PUBLICATIONS

Cruz-Garcia, et al., "Respiratory nitrate ammonification by Shewanella oneidensis MR-1," *J Bacteriol*, vol. 189, No. 2, pp. 656-662 (Jan. 2007).
David, et al., "Nitrogen balance in and export from an agricultural watershed," *J Environ Qual.*, vol. 26, pp. 1038-1048 (1997).
Dichristina, T.J., "Effects of Nitrate and Nitrite on Dissimilatory Iron Reduction by *Shewanella putrefaciens* 200," J Bacteriol, vol. 174, No. 6, pp. 1891-1896 (1992).
Dinnes, et al., "Nitrogen Management Strategies to Reduce Nitrate Leaching in Tile-Drained Midwestern Soils," *Agronomy Journal*, vol. 94, pp. 153-171 (2002).
Extended European Search Report issued by the European Patent Office for European Application No. 10789884.3 dated May 16, 2013 (10 pgs.).
Extended European Search Report issued by the European Patent Office for European Application No. 11809996.9 dated Jul. 7, 2014 (5 pgs.).
Extended European Search Report issued by the European Patent Office for European Application No. 11810413.2 dated Jul. 28, 2014 (5 pgs.).
Extended European Search Report issued by the European Patent Office for European Application No. 11835081.8 dated Oct. 31, 2014 (7 pgs.).
Faeth, P., "Fertile Ground: Nutrient Trading's Potential to Cost-Effectively Improve Water Quality," Washington, DC: World Resources Institute, 59 pgs. (2000).
Freguia, et al., "Electron and Carbon Balances in Microbial Fuel Cells Reveal Temporary Bacterial Storage Behavior During Electricity Generation," Environmental Science & Technology, vol. 41, No. 8, pp. 2915-2921 (Apr. 2007).
Gieling, et al., "ISE and Chemfet sensors in greenhouse cultivation," *Sensors and Actuators B*, vol. 105, pp. 74-80 (2005).
Gorby, et al., "Electrically conductive bacterial nanowires produced by Shewanella oneidensis strain MR-1 and other microorganisms." *Proceedings of the National Academy of Sciences*, vol. 103, No. 30, pp. 11358-11363 (2006).
Grommen, et al., "Removal of Nitrate in Aquaria by Means of Electrochemically Generated Hydrogen Gas as Electron Donor for Biological Denitrification," *Aquacultural Engineering*, vol. 34, No. 1, pp. 33-39 (2006).
Hallenbeck, P.C. and Benemann, J.R., "Biological hydrogen production; fundamentals and limiting processes." Int. J. Hydrogen Energy, vol. 27, pp. 1185-1193 (2002).
He, et al., "Electricity Generation from Artificial Wastewater Using an Upflow Microbial Fuel Cell," Environmental Science & Technology, vol. 39, No. 14, pp. 5262-5267 (Jul. 2005).
He, Zhen, and Angenent, L.T., "Application of Bacterial Biocathodes in Microbial Fuel Cells," Electroanalysis, vol. 18, No. 19-20, pp. 2009-2015 (Oct. 2006).
Holmes, et al., "Potential Role of a Novel Psychrotolerant Member of the Family Geobacteraceae, *Geopsychrobacter electrodiphilus* gen. nov., sp. nov., in Electricity Production by a Marine Sediment Fuel Cell," *Applied and Environmental Microbiology*, vol. 70, No. 10, pp. 6023-6030 (2004).
International Search Report and Written Opinion issued by the Korean Intellectual Property Office as International Searching Authority for International Application No. PCT/US2010/025224 dated Oct. 12, 2010 (10 pgs.).
International Search Report and Written Opinion issued by the Korean Intellectual Property Office as International Searching Authority for International Application No. PCT/US2011/032500 dated Dec. 27, 2011 (11 pgs.).
International Search Report and Written Opinion issued by the Korean Intellectual Property Office as International Searching Authority for International Application No. PCT/US2011/044872 dated Mar. 15, 2012 (12 pgs.).
International Search Report and Written Opinion issued by the Korean Intellectual Property Office as International Searching Authority for International Application No. PCT/US2011/056920 dated May 31, 2012 (10 pgs.).
Van Rijn, J., "The Potential for Integrated Biological Treatment Systems in Recirculating Fish culture—A Review." Aquaculture, vol. 139, No. 3-4, pp. 181-201 (1996).
Jia, et al., "Simultaneous Organics Removal and Bio-Electrochemical Denitrification in Microbial Fuel Cells," *Bioprocess and Biosystems Engineering*, vol. 31, No. 4, pp. 315-321 (2008).
Kang, et al., "A microbial fuel cell with improved cathode reaction as a low biochemical oxygen demand sensor," *Biotechnology Letters*, vol. 25, pp. 1357-1361 (2003).
Kim, et al., "A Microbial Fuel Cell Type Lactate Biosensor Using a Metal-Reducing Bacterium, Shewanella Putrefaciens," J. Microbiol. Biotechnol., vol. 9, No. 3, pp. 365-367 (1999).
Kim, et al., "Membrane-electrode assembly enhances performance of a microbial fuel cell type biological oxygen demand sensor," *Environmental Technology*, vol. 30, No. 4, pp. 329-336 (Apr. 1, 2009).
Kim, et al., "Novel BOD (biological oxygen demand) sensor using mediator-less microbial fuel cell," *Biotechnology Letters*, vol. 25, pp. 541-545 (2003).
Kostka, J.E. and Nealson, K.H., "Dissolution and reduction of magnetite by bacteria," *Environ Sci Technol*, vol. 29, pp. 2535-2540 (1995).
Kreysa, et al., "Bioelectromechanical Hydrogen Production," International Journal of Hydrogen Energy, vol. 19, No. 8, pp. 673-676 (Aug. 1, 1994).
Kumlanghan, et al., "Microbial fuel cell-based biosensor for fast analysis of biodegradable organic matter," *Biosensors and Bioelectronics*, vol. 22, pp. 2939-2944 (2007).
Kuroda, et al., "$CO_2$ Reduction to Methan and Acetate using a Bio-electro Reactor with Immobilized Methanogens and Homoacetogens on Electrodes," Energy Convers. Mgmt., vol. 36, No. 6-9, pp. 787-790 (1995).
Lee, et al., "Fate of H 2 in an Upflow Single-Chamber Microbial Electrolysis Cell Using a Metal-Catalyst-Free Cathode," Environmental Science & Technology, vol. 43, No. 20, pp. 7971-7976 (Oct. 15, 2009).
Liu, et al., "Immobilised Activated Sludge Based Biosensor for Biochemical Oxygen Demand Measurement," *Biosensors and Bioelectronics*, vol. 14, No. 12, pp. 883-893 (2000).
Liu, et al., "Power Generation in Fed-Batch Microbial Fuel Cells as a Function of Ionic Strength, Temperature, and Reactor Configuration," Environ. Sci. Technol., vol. 39, No. 14, pp. 5488-5493 (2005).
Liu, et al., "Production of Electricity during Wastewater Treatment Using a Single Chamber Microbial Fuel Cell." Environmental Science & Technology, vol. 38, No. 7 pp. 2281-2285 (2004).
Liu, J. and Mattiasson, B., "Microbial BOD Sensors for Wastewater Analysis," *Water Research*, vol. 36, No. 15, pp. 3786-3802 (2002).
Logan, Bruce E, and Regan, John M., "Microbial Fuel Cells: Challenges and Applications." *Environmental Science & Technology*, vol. 40, No. 17, pp. 5172-5180 (Sep. 1, 2006).
Logan, et al., "Electricity generation from cysteine in a microbial fuel cell," Water Res., vol. 39, pp. 942-952 (2005).
Logan, et al., "Graphite Fiber Brush Anodes for Increased Power Production in Air-Cathode Microbial Fuel Cells," Environmental Science & Technology, vol. 41, No. 9, pp. 3341-3346 (May 2007).
Logan, et al., "Microbial Electrolysis Cells for High Yield Hydrogen Gas Production from Organic Matter," Environmental Science & Technology, vol. 42, No. 23, pp. 8630-8640 (Dec. 2008).
Logan, et al., "Microbial Fuel Cells: Methodology and Technology," Environmental Science & Technology, American Technology Society, vol. 40, No. 17, pp. 5181-5192 (Jul. 14, 2006).
Min, et al., "Electricity Generation from Swine Wastewater Using Microbial Fuel Cells," Water Research, vol. 39, No. 20, pp. 4961-4968 (Dec. 2005).
Niessen, et al., "Gaining Electricity from in Situ Oxidation of Hydrogen Produced by Fermentative Cellulose Degradation," Letters in Applied Microbiology, vol. 41, No. 3, pp. 286-290 (Sep. 2005).

(56) References Cited

OTHER PUBLICATIONS

Oh, S., and Logan, B., "Hydrogen and Electricity Production from a Food Processing Wastewater Using Fermentation and Microbial Fuel Cell Technologies," Water Research, vol. 39, pp. 4673-4682 (2005).

Pham, et al., "Microbial Fuel Cells in Relation to Conventional Anaerobic Digestion Technology," Engineering in Life Sciences, vol. 6, No. 3, pp. 285-292 (2006).

Rabaey, et al., "Biofuel Cells Select for Microbial Consortia That Self-Mediate Electron Transfer," Applied and Environmental Microbiology, vol. 70, No. 9, pp. 5373-5382 (Sep. 2004).

Rabaey, et al., "Cathodic Oxygen Reduction Catalyzed by Bacteria in Microbial Fuel Cells," The ISME Journal, vol. 2, No. 5, (Feb. 2008), 9 pages.

Rabaey, et al., "Tubular Microbial Fuel Cells for Efficient Electricity Generation," Environmental Science and Technology, vol. 39, No. 20 (2005): 8077-82 (2005).

Rabaey, K. and Verstraete, W., "Microbial Fuel Cells: Novel Biotechnology for Energy Generation," Trends in Biotechnology, vol. 23, No. 6, pp. 291-298 (2005).

Ratako, et al., "Micro- and Mini-Nitrate Sensors for Monitoring of Soils, Groundwater and Aquatic Systems," *Center for Embedded Network Sensing*, 3 pgs. (May 12, 2009).

Rezaei, et al., "Substrate-enhanced microbial fuel cells for improved remote power generation from sediment-based systems," *Environ Sci. Technol.*, vol. 41, pp. 4053-4058 (2007).

Ringeisen, et al., "High Power Density from a Miniature Microbial Fuel Cell Using Shewanella oneidensis DSP10," *Environ. Sci. Technol.*, vol. 40, pp. 2629-2634 (2006).

Rozendal, et al., "Principle and Perspectives of Hydrogen Production through Biocatalyzed Electrolysis," International Journal of Hydrogen Energy, vol. 31, No. 12, pp. 1632-1640 (Sep. 2006).

Selembo, et al., "The Use of Stainless Steel and Nickel Alloys as Low-Cost Cathodes in Microbial Electrolysis Cells," Journal of Power Sources, vol. 190, No. 2, pp. 271-278 (May 2009).

Shantaram, et al., "Wireless sensors powered by microbial fuel cells," *Environ Sci Technol*, vol. 39, pp. 5037-5042 (2005).

Sukkasem, et al., "Effect of Nitrate on the Performance of Single Chamber Air Cathode Microbial Fuel Cells," Water Research, vol. 42, No. 19, pp. 4743-4750 (Dec. 2008).

Tabacova, et al., "Exposure to Oxidized Nitrogen: Lipid Peroxidation and Neonatal Health Risk," *Archives of Environmental Health: An International Journal*, vol. 53, No. 3, (1998), 9 pages.

Tabacova, et al., "Maternal Exposure to Exogenous Nitrogen Compounds and Complications of Pregnancy," *Archives of Environmental Health: An International Journal*, vol. 52, No. 5, (1997), 8 pages.

Van Ginkel, et al., "Biohydrogen gas production from food processing and domestic wastewaters," Int. J. Hydrogen Energy, vol. 30, pp. 1535-1542 (2005).

Virdis, et al., "Microbial Fuel Cells for Simultaneous Carbon and Nitrogen Removal," Water Research, vol. 42, No. 12, pp. 3013-3024 (2008).

Vitousek, et al., "Human Alteration of the Global Nitrogen Cycle: Sources and Consequences," *Ecological Applications*, vol. 7, No. 3, pp. 737-750 (1997).

Whitmore, et al. "Hydrogen-Dependent Control of the Continuous Anaerobic Digestion Process". Appl. Microbiol. Biotechnol., vol. 26, pp. 383-388 (1987), 383.

Wilson, et al., "The Effect of Temperature on the Performance and Stability of Thermophilic Anaerobic Digestion." Water Science & Technology, vol. 57, No. 2, pp. 239-246 (Jan. 2008).

Yokoyama, et al., "Treatment of Cow-Waste Slurry by a Microbial Fuel Cell and the Properties of the Treated Slurry as a Liquid Manure," Animal Science Journal, vol. 77, No. 6, pp. 634-638 (Dec. 2006).

Zhang, Y., and Angelidaki, I., "Submersible microbial fuel cell sensor for monitoring microbial activity and BOD in groundwater: Focusing on impact of anodic biofilm on sensor applicability," *Biotechnology and Bioengineering*, vol. 108, No. 10 (2011), 34 pages.

\* cited by examiner

US 10,851,003 B2

DENITRIFICATION AND PH CONTROL USING BIO-ELECTROCHEMICAL SYSTEMS

REFERENCE TO RELATED APPLICATIONS

This application is a U.S. National Stage Application under 35 U.S.C. § 371 of PCT/US2011/044872 filed Jul. 21, 2011 and claims priority to U.S. Provisional Application No. 61/366,271, filed Jul. 21, 2010, and U.S. Provisional Application No. 61/496,603, filed Jun. 14, 2011. The contents of each of these applications are herein incorporated by reference in their entireties.

STATEMENT OF GOVERNMENT INTEREST

This invention was made with Government support under Contract 1127435 awarded by the National Science Foundation. The U.S. Government has certain rights in this invention.

TECHNICAL FIELD

The invention relates to methods and devices for the treatment of nitrogenous waste components and reduced organic compounds in wastewater from industrial water treatment facilities. In particular, the present invention includes reactor design, component designs, and operating schemes for removing nitrates and reduced organic compounds from any suitable wastewater stream. The invention also describes reactor designs, component designs, and operating schemes designed to modify and improve pH and water quality in wastewater streams.

BACKGROUND OF THE INVENTION

The removal of nitrogen in its various forms is an increasingly important objective in wastewater treatment. When released into the environment nitrogen can caused algal blooms in oceans, pollute lakes and rivers, and pollute drink wells and reservoirs. Two areas where nitrogen is particularly difficult to address involves public and private treatment works, and anaerobic digestion fish farming (aquaculture).

Nitrogen can be a problem in integrated treatment works, particularly where biogas is produced. Because much of the carbon is removed from wastewater in the form of carbon dioxide and methane, the bulk solution can develop high levels of ammonia and low carbon/nitrogen (C:N) ratios. Ammonia can be nitrified using aeration, but this then requires addition of a carbon source (such as methanol) to remove the remaining nitates if C:N ratios are low.

Similarly, re-circulating aquaculture systems (RAS), also known as closed-loop systems, offer a possibility for large scale, sustainable fish production. However, economical and efficient wastewater treatment is a critical bottleneck to the sustainable growth of the RAS and semi-RAS industry in the U.S. and worldwide. RAS, and other such closed-loop systems, produce high concentrations of dissolved nitrogenous waste components and reduced organic compounds, which in turn stress the chemical oxygen demand (COD) and biological oxygen demand (BOD) in the system.

At high concentrations, nitrates can affect fish in re-circulating systems. In flow-through systems they can result in high fees charged to the operator, depending on the region. In Europe, nitrates are highly regulated with active monitoring in discharge waters and in the United States there is anticipation of increased enforcement of the 10 mg/L regulation imposed by the Environmental Protection Agency as the industry grows. Thus it is vital to develop economical waste management technologies in order for the aquaculture industry to grow sustainably and profitably.

Low C:N ratios in aquaculture effluent make nitrate management particularly difficult for the aquaculture industry. Currently, no existing denitrification solutions are fully adequate. Nitrates can be removed via water exchange, but this must often be as high as 10-20% of the system volume per day. As regulations become stricter, the release of nitrates at end of pipe will likely be treated with increasing stringency. Nitrates can be removed via anaerobic denitrification by heterotrophic bacteria such as *Pseudomonas*. However, the low C:N ratios in aquaculture effluent require costly addition of a carbon source such as methanol. Alternatively, organic matter (e.g. sludge) from the same facility can be used in the place of methanol in up-flow anaerobic sludge blanket reactors (UASB). However, the sludge is often in particulate form. As such, hydrolysis and fermentation must be applied to convert the sludge into volatile fatty acids and other molecules more easily consumed by denitrifying organisms, adding complexity and cost to the operation. More importantly, mixing culture tank water with pathogenic sludge requires costly sterilization and raises a serious risk of bio-contamination in the facility. In addition, aquaculture producers have discussed significant off-flavors in the product fish when using sludge as a COD source for denitrification.

End-of-Pipe (EOP) treatment is another particularly important kind of treatment common to RAS and semi-RAS. EOP treatment is defined as treatment for wastewater leaving an aquaculture facility and entering the environment. Most end-of-pipe flows have common cause in the concentrated discharge from primary treatment technologies, such drum filters, belt filters, bio-filters, or settling tanks. In recent tests of drum-filter discharge, high levels of COD (1000 mg/L), Nitrate (100 mg/L) and TSS (2000 mg/L) were found, far exceeding regulatory limits. While the composition of this stream varies with fish species and facility-type, the requirements for output are the same at most farms.

Aeration technology might be used to treat EOP wastewater. However, this is often uneconomical at the scale of fish-farming, and it is exceedingly energy intensive. It also results in a solids stream which must also be managed. Some new systems have been developed—for example, a Geotube® system is available which can treat BOD, nitrogen and nitrates (Tencate). However, the GeoTube® uses a high cationic polymer to precipitate end-of-pipe streams. At large scale, this polymer becomes expensive and risks harming fish if wash-back occurs. EOP treatment is particularly important for the future of the aquaculture industry because current advances in treatment systems continue to create concentrated streams that must be dealt with economically. As concerns over our nations water quality grows, the economic needs of the industry will be increasingly at odds with societal needs for unpolluted waterways.

To date, the control of dissolved oxygen and removal of toxic ammonia (nitrification) have been the main objectives of RAS wastewater treatment systems. But as the industry matures, it is becoming increasingly evident that end-of-pipe biological oxygen demand (BOD) and elevated nitrate levels in the culture water are now the roadblocks to increased water re-use and higher fish yields. Thus, there is a great need for improved technologies that can economically remove nitrates and chemical oxygen demand (COD) from wastewater streams, and manage pH.

SUMMARY OF INVENTION

The present invention provides improved bio-electrochemical systems and methods for removing nitrates and reduced organic compounds from wastewater streams such as those produced by industrial water treatment facilities. In particular, the present invention provides improved reactor designs, component designs, and operating schemes for removing nitrates and reduced organic compounds from any suitable wastewater stream. The invention also describes reactor designs, component designs, and operating schemes designed to modify and improve pH and water quality in wastewater streams.

The bio-electrochemical system for treating wastewater include at least one reaction module comprising two electrode chambers of the same polarization and one electrode chamber of a different polarization, each of the electrode chambers being arranged succession in substantial proximity to the other. For example, the bio-electrochemical system can include a cathode chamber housing a cathode and two anode chambers, each housing an anode, with the cathode chamber being sandwiched between the two anode chambers. Alternatively, the bio-electrochemical system can include an anode chamber housing an anode and two cathode chambers, each housing a cathode, with the anode chamber being sandwiched between the two cathode chambers. Each of the electrode chambers can be arranged in vertical succession (e.g., stacked), or in horizontal succession (e.g., side by side).

The electrode chambers are coupled together via external circuitry. In certain embodiments, two or more of the electrode chambers in the reaction module are electrically connected in series. Alternatively, two or more of the electrode chambers in the reaction module can be electrically connected in parallel.

One or more of the electrode chambers can include at least one electrogenic microbe in proximity to the electrode housed within.

In certain embodiments, the bio-electrochemical system of the invention includes comprises a plurality of reaction modules, each reaction module including two electrode chambers of the same polarization and one electrode chamber of a different polarization. The plurality of reaction modules are preferably arranged in succession in substantial proximity to the other. The plurality of reaction modules can be arranged in vertical succession (e.g., stacked) or in horizontal succession (e.g., side by side). In certain embodiments, one or more of the plurality of reaction modules are configured to be removable/interchangeable from the bio-electrochemical system.

The reaction module(s) can be of any length or width. In a particular embodiment, the reaction module has a substantially flat configuration/shape.

A selectively permeable membrane can be disposed between the electrode chambers within one or more of the reaction modules. The selectively permeable membrane can be a proton exchange membrane, or an ion (e.g., cation, anion) exchange membrane. In certain embodiments, the selectively permeable membrane is adapted to be removable/interchangeable from the system.

The electrodes housed with the electrode chambers can be made of one or more materials including but not limited to carbon cloth, carbon mesh, a solid support coated on at least one side with a conductive material, activated carbon, graphite granules, charcoal, biochar and stainless steel. The electrodes of the same polarization and different polarization can each be made of the same material or different material. For example, the bio-electrochemical system of the invention can include two anodes, each comprised of carbon cloth, and a cathode comprised of graphite granules. In some embodiments, at least one of the electrodes (e.g., a cathode) comprises a combination of graphite or carbon-based material, and stainless steel. In a particular embodiment, one or more of the electrodes are made of a solid support (e.g., plastic) coated on at least one side with a conductive material, such as carbon paint or carbon epoxy.

The bio-electrochemical systems of the invention can further include at least one pre-treatment tank coupled to the bio-electrochemical system for pre-treating the wastewater. Where the bio-electrochemical the system includes a plurality of reaction modules, at least one common pre-treatment tank can be coupled to all electrodes of the same polarization within the plurality of reaction modules and a separate treatment tank coupled to all the electrodes of a different polarization within the plurality of reaction modules. A splitting manifold can be used to split the pre-treated wastewater stream from the pre-treatment tank into the respective electrodes within the plurality of reaction modules.

In certain embodiments, a power source is coupled to the bio-electrochemical system to apply a voltage to the electrodes within the plurality of reaction modules. The same voltage can be applied across the plurality of reaction modules. Alternatively, a different voltage is selectively applied across the plurality of reaction modules.

In certain embodiments, the bio-electrochemical system is configured to funnel a reaction product produced at in an anode chamber (e.g., $CO_2$) into a cathode chamber.

In certain aspects, one or more of the electrodes in the bio-electrochemical system of the invention are configured to operate at a poised potential.

In certain embodiments, at least one of the electrode chambers within the bio-electrochemical system of the invention can include an ammonia oxidizing bacteria.

In certain aspects, the present invention provides a method for removing nitrogenous waste and reduced organic compounds from a wastewater source, by providing a bio-electrochemical system comprising at least one anode chamber and at least one cathode chamber, each chamber being arranged in substantial proximity to each other coupled via external circuitry; separating the wastewater source into a first stream comprising a high biological oxygen demand (e.g., a stream having a high concentration of solid organic compounds) and a second stream comprising a high chemical oxygen demand (e.g., a stream having high concentration of ammonia and nitrates); and flowing the first stream through the anode chamber and the second stream through the cathode chamber of the bio-electrochemical system. Oxidation reactions in the anode chamber and reduction reactions in the cathode chamber reduce the biological oxygen demand in the first stream and the chemical oxygen demand in the second stream, thereby treating the wastewater source. A device such as a mechanical filter, a settling filter, a drum or canister filter or a centrifugation-based filter can be used to separate the wastewater into the first and second streams. Once separated, the first and second streams do not mix throughout the treatment process.

The methods of the invention are particularly suited for recirculating or semi-recirculating industrial water treatment facilities, including but not limited to aquacultures and municipal water treatment facilities. The bio-electrochemical system can be disposed externally from the wastewater source. In certain embodiments, the bio-electrochemical system is at least partially disposed within the wastewater source. For example a cathode chamber is disposed within the wastewater source.

A nitrifying reactor can be coupled to the bio-electrochemical system upstream of the cathode chamber, such that the second stream flows through the nitrifying reactor prior to flowing through the cathode chamber.

An oxygen monitor/feedback system can be coupled to the bio-electrochemical system upstream of the anode chamber such that the first stream flows through the oxygen monitor prior to flowing through the anode chamber.

In certain embodiments, the bio-electrochemical system includes a selectively permeable membrane disposed between the at least one anode chamber and the at least one cathode chamber. The selectively permeable membrane is an ion exchange membrane such as a cation exchange membrane or an anion exchange membrane.

In certain embodiments, the effluent from the at least one anode chamber is re-circulated to the wastewater treatment source.

BRIEF DESCRIPTION OF THE DRAWINGS

In the drawings, like reference characters generally refer to the same or similar parts throughout the different views. Also, the drawings are not necessarily to scale, emphasis instead generally being placed upon illustrating the principles of the invention.

DETAILED DESCRIPTION

Figure 9A:
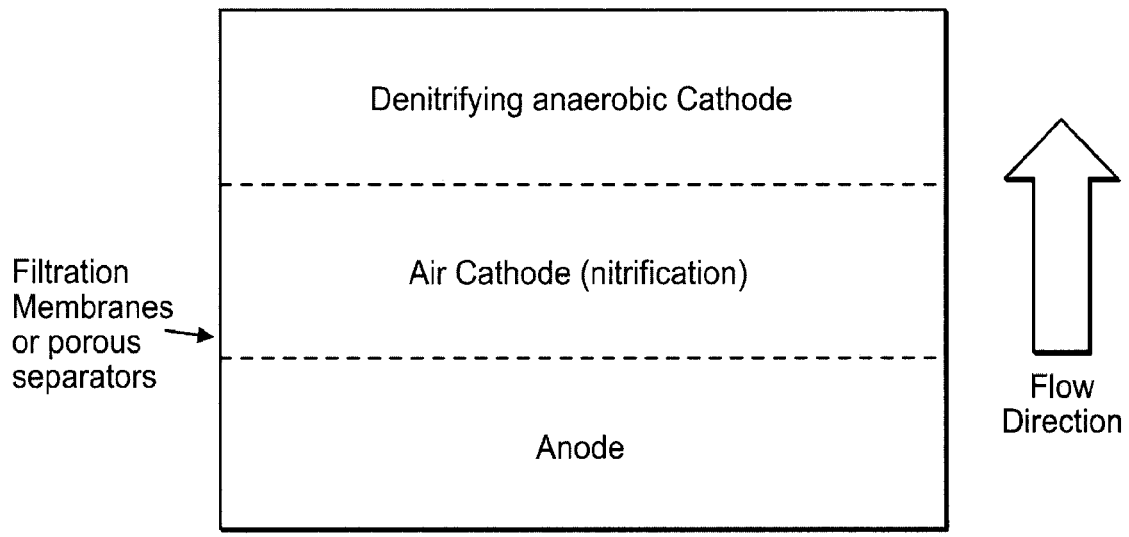
FIGS. 9A and 9B each depict an exemplary embodiment of a bio-electrochemical system according to the invention.
Figure 9B:
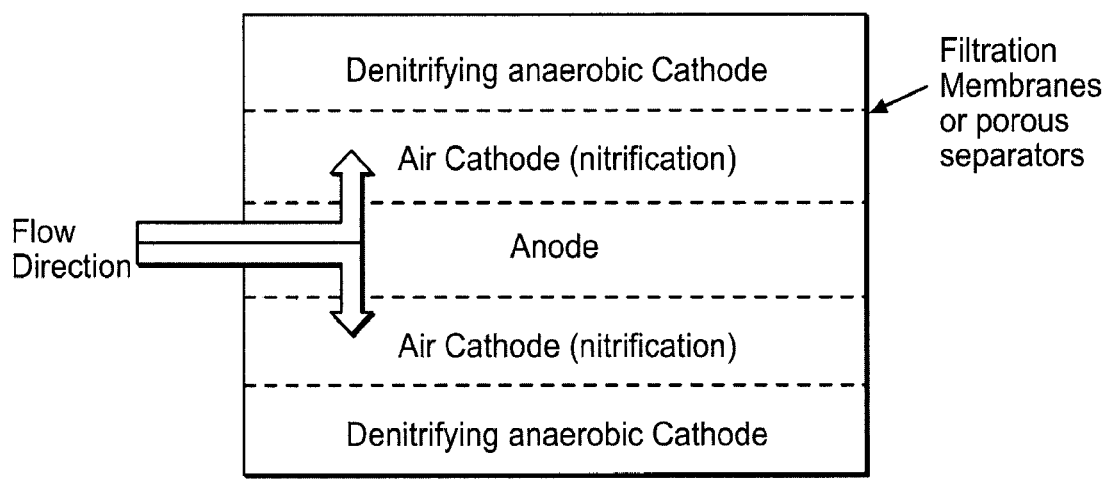

The present invention provides novel architecture and components for an electrogenic system for improving wastewater treatment rates and are particularly useful for industrial scale water treatment facilities, such as aquaculture systems, and municipal water treatment plants. The architectures of the bio-electrochemical systems (BES) described herein enhance waste water treatment rates by leveraging newly discovered electrically active bacteria and reactor design to simultaneously denitrify culture tank water, remove end-of-pipe biological oxygen demand (EOP BOD) without crossing wastewater streams, and generate electricity. In some embodiments the reactor can anaerobically nitrify in an anode using anaerobic ammonia oxidizing bacteria and anaerobically denitrify in a cathode using nitrate and nitrite reducing bacteria. For example, an aeraobic nitrification step is placed in a first stage cathode (e.g., a bio-air cathode) followed by an anaerobic denitrifying cathode (see e.g., FIGS. 9A and 9B).

Figure 1:
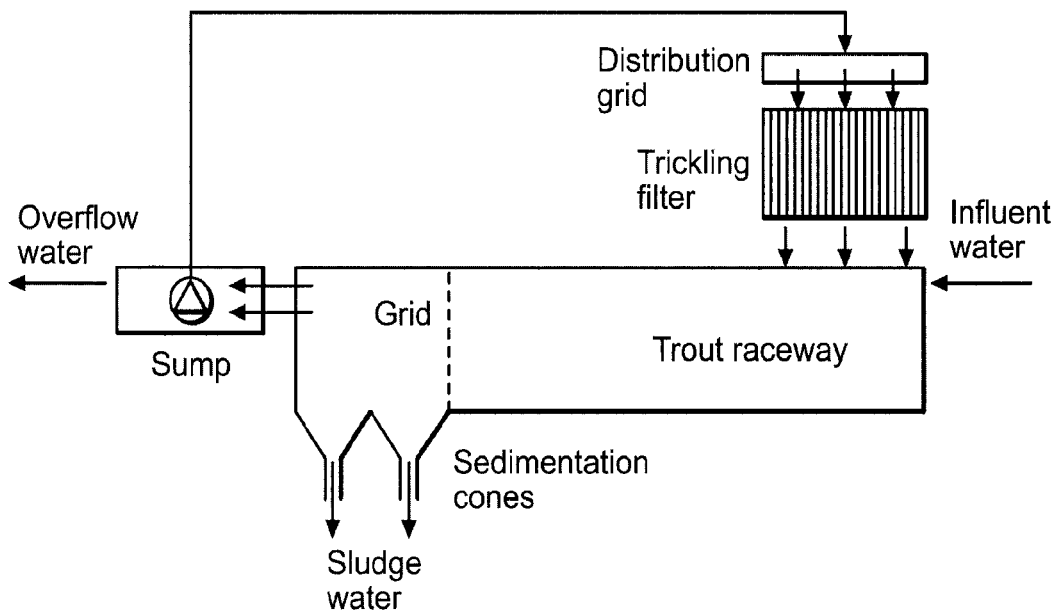
FIG. 1 depicts a schematic of a typical semi-re-circulating aquaculture process design.

An example of a typical semi-re-circulating aquaculture process design (semi-RAS) is depicted in FIG. 1. The bio-electrochemical systems and processes described herein addresses nitrate accumulation in the main re-circulation loop of an RAS, semi-RAS or other such closed-loop system, as well as concentrated end-of-pipe BOD (e.g., sludge water).

Generally, bio-electrochemical systems (BESs) have been shown to generate chemical products or electricity by exploiting the ability of certain microbes (typically termed "electrogens", "exoelectrogens" or "electricigens" in the literature) to transfer electrons to electrodes or accept electrons from electrodes while consuming organic matter. Similar to a chemical fuel cell, an oxidation reaction in the anodic chamber releases energy, electrons and ions. These migrate to the cathodic region where they are reduced to form a substance with lower free energy of formation.

BESs typically consist of electrodes, such as anode and cathodes, both or individually coated in biofilms with the ability to transfer or accept electrons from electrodes. Electrodes may also be coated in noble metals to catalyze one of the reactions taking place. The electrodes can be separated by an electrolyte which conveys ions between them (ion selective membrane can be included, but membrane-less systems also work). Electrodes, biofilms, electrolytes, and catalysts may or may not be enclosed in a casing. Each of these elements, which include the casing, can be connected to external circuits, control systems, or other reactors for use in combined systems. The geometrical configuration of the elements in a BES and their material definition can together be defined as the "architecture" of the system. It should be noted that the terms "bio-electrochemical system", "microbial fuel cell", and "reactor" are sometimes used interchangeably herein.

The typical BES is a two-chamber system, consisting of both anode and cathode chambers separated by a selectively permeable membrane. Modifications to applied potentials and architecture have allowed BESs to carry out a variety of tasks including hydrogen, methane, and hydrogen peroxide production, as well as water desalination and nitrogen removal. Molecular characterizations of microbial fuel cell biofilm communities suggest that the ability for exogenous electron transfer is widespread among bacteria, and that electrogenic bacteria are abundant in wastewater. BESs have been successfully operated when supplied a wide array of waste streams such as domestic, winery and potato chip. In these cases, BOD is oxidized at a biological anode with the cathode reducing a range of substrates, often $O_2$.

Figure 2:
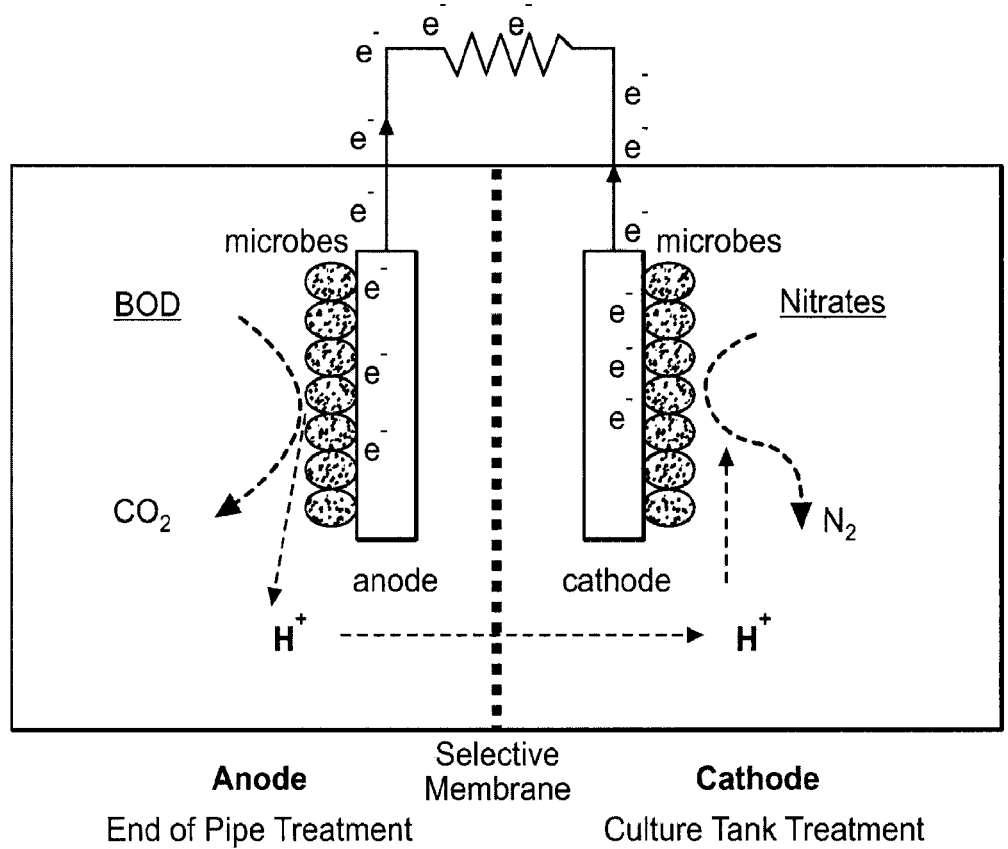
FIG. 2 depicts a general schematic for treating biological oxygen demand of a wastewater stream at the anode and nitrates (chemical oxygen demand) at the cathode of a bio-electrochemical system.

The present invention provides novel reactor designs for BESs in which the EOP water is oxidized in the anode chamber of the BES, while nitrate-rich water is reduced in the cathode chamber (see e.g., FIG. 2). Like a traditional fuel cell, a circuit connecting anode and cathode captures energy. The bio-electrochemical systems described herein work by providing an electrically conductive media on which certain species of microbes will attach and use the electrode as either an electron sink or electron source, depending on whether they are effecting an oxidation or reduction reaction, respectively. Oxidative metabolic processes occur in the anode compartment, where electricigen microbes consume reduced organic compounds, liberating high-potential electrons that are used for their internal metabolic processes, but must ultimately be transferred to a terminal electron acceptor at a lower potential.

A variety of electricigen microbes have been catalogued and are known to those of ordinary skill in the art, including but not limited to microbes from the *Geobacter, Clostridia, Rhodeferax* and *E. coli* families. Such microbes can be utilized in the BESs of the present invention. Alternatively, multi-strain communities of electricigen microbes naturally present in wastewater streams can serve as a source of electrigen microbes in the bio-electrochemical systems of the invention. Because the reactor volume is kept in an anaerobic or anoxic (low-oxygen) state, microbes utilize the anodic electrode surface as an electron sink. External circuitry provides these electrons with a path to the cathodic electrode, which is colonized by a separate consortium of microbes that accept these electrons for use in the reduction of low potential chemical species, in this case generally nitrate and oxygen.

The amount of power generated by a bio-electrochemical system is a function of the potential difference between the free energy of formation of the oxidants and reductants (in this case complex organics (acetate) and nitrate), as well as the reaction rates. Given the numerous benefits associated with the overall process, it is often more advantageous to maximize treatment rate (e.g. denitrification) rather than total power. Stand-out advantages of the reactor designs and component designs describe herein include the following: (i) the use of electrons from end-of-pipe BOD to reduce nitrates, therefore unlike UASB technology there is no requirement for carbon addition (such as methanol); (ii) there is no requirement for operators to mix EOP streams with culture tank water, thus removing the need for extensive and costly pathogen removal; (iii) and decreased requirement for caustic alkalinity addition to adjust pH of denitrified culture water stream.

Design of Reactor and Components

The bio-electrochemical systems of the invention generally include at least reaction modules housing 3-electrode chambers, where two electrode chambers of the same polarization sandwich another electrode chamber of a different polarization. For example, a BES of the invention can include a single cathode chamber with two anode chambers on opposing sides. Alternatively, a BES of the invention can include a single anode chamber with two cathode chambers on opposing sides. The electrodes can be arranged in vertical succession. Alternatively the electrodes are arranged in horizontal succession. The electrodes can be electrically coupled/connected either in series or in parallel.

In certain embodiments, the bio-electrochemical systems of the invention include a plurality of reaction modules, each comprising 3 electrode chambers, where two electrode chambers of the same polarization sandwich another electrode chamber of a different polarization. The plurality of reaction modules are arranged in succession in substantial proximity to each other. For example, the plurality of reaction modules can be arranged in vertical succession, or horizontal succession. In certain embodiments, the plurality of reaction modules are configured to be removable/interchangeable from the BES.

In certain embodiments, a selectively permeable membrane is disposed between the electrodes within the one or more reaction modules. For example, a cation exchange membrane will prevent nitrates from moving across. However, in some embodiments, an anion exchange membrane may be useful for shuttling nitrates into the anode chamber, thus enabling preferential concentration and removal of nitrates into the COD laden anode stream in addition to cathodic nitrate reduction.

The selectively permeable membrane can be permanently integrated with the system or removable/interchangeable. In a particular embodiment, the membrane is in the form of an interchangeable cassette that can be removed from the system for cleaning, and/or swapped out for a different type of membrane, depending on the desired application of the BES system. The membrane cassette can itself be sandwiched by conductive wire mesh that serves to both support the membrane and act as an electrode.

The length and width of the chambers is constant for all test cells, and can be any suitable length and width ranging from several centimeters of tens of centimeters in width, and a length of several meters per module. For example, each chamber can have a width ranging from 1-1000 cm, 1-500 cm, 1-250 cm, 1-100, 1-90 cm, 1-80 cm, 1-70 cm, 1-60 cm, 1-50, 1-40 cm, 1-30 cm, 1-20 cm, 1-10 cm, or any specific value in between these ranges; and length ranging from 1-10 m, 1-5 m, 1-3 m or any specific value within these ranges (e.g., 2 m). The chamber thickness and resulting membrane spacing can be a fixed membrane spacing between the different electrodes, or can vary between the different electrodes. In a particular embodiment, the electrode chambers and resulting membrane spacing have a suitable length and width such that the electrode chambers are flat, or substantially flat in shape (see e.g., FIG. 3).

The electrodes can be constructed from the same material. For example, both the anode and cathode can be any flat or granular conductive material including but not limited to: carbon cloth, carbon mesh, plastic sheet with paintable carbon applied, activated carbon, graphite granules, charcoal, biochar, and stainless steel. Alternatively, the electrodes can be constructed from different materials. For example, the anode can be carbon cloth, while the cathode is granular graphite. In some embodiments, the cathode electrode can include a combination of graphite or carbon-based material and stainless steel, or some similar catalyzing metal. In a particular embodiment, the electrode is composed of a rigid substrate/solid support structure such as plastic, coated in a conductive material such carbon paint or carbon epoxy. The conductive material can be sprayed onto the solid support structure with enough coats to achieve a desire resistance. Alternatively, the electrodes can include a conductive wire such as copper sheathed in plastic and allowed to protrude from the plastic in certain places in order to make contact with the conductive coating and collect current. In some embodiments, the electrodes can include a combination of the elements above in a removable cassette designed to clean the membrane when it is removed. For example, graphite brush can be placed on a carbon-epoxy coated electrode.

Figure 10:
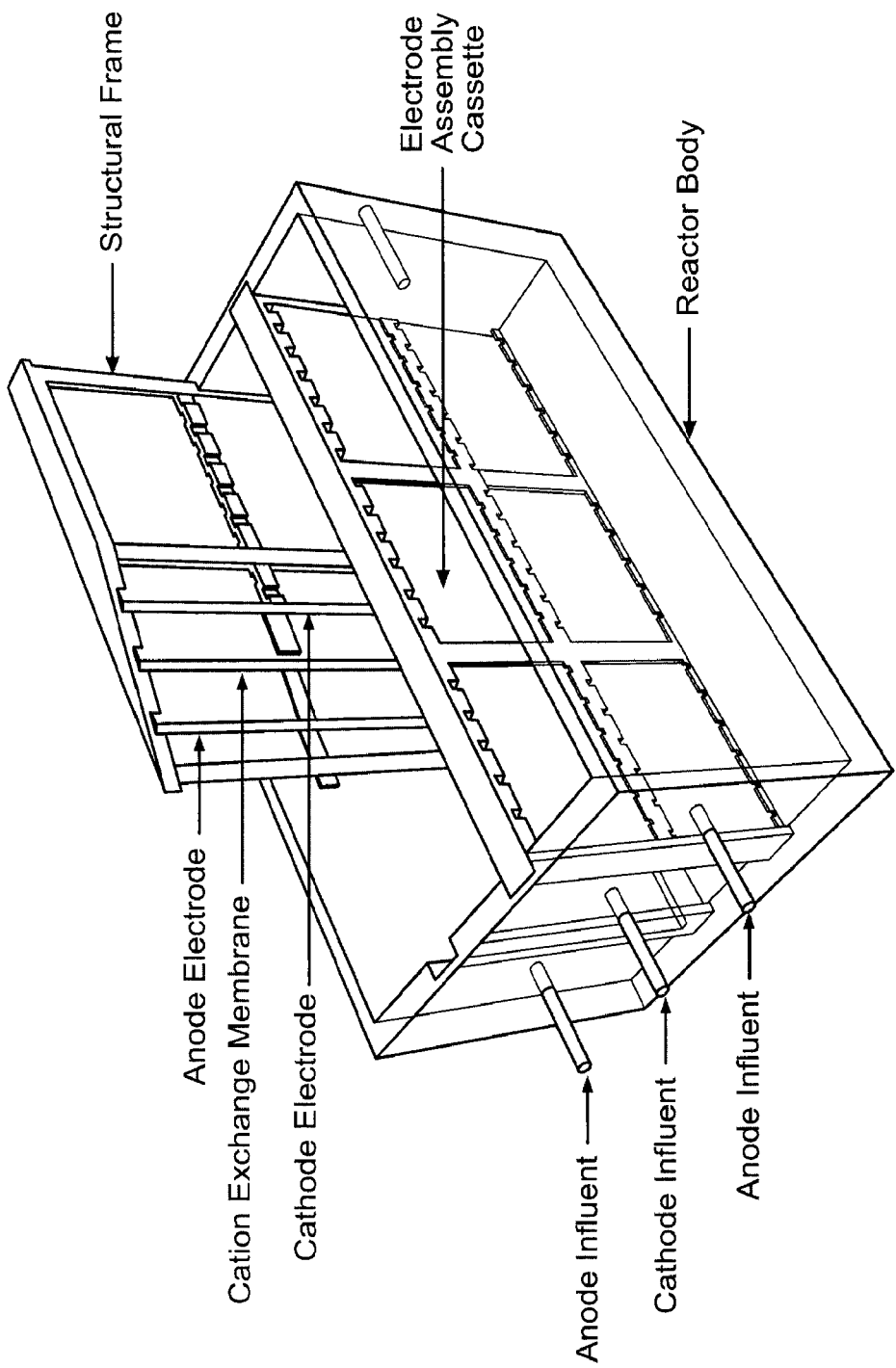
FIG. 10 is an exemplary embodiment of a removable/interchangeable reaction module for a bio-electrochemical system in accordance with the invention.

The membrane and electrodes can be designed to minimize labor associated with cleaning and maintaining. For example, the electrodes can include a carbon cloth on a solid support, and the solid support can be clamped loosely to the membrane and removed so as to apply pressure to the membrane and clean it of biofilm. In this embodiment the two electrodes and the membrane can be cassettes that are placed in the reactor and easily removed (see FIG. 10).

The electrodes can be arranged in one of two preferred embodiments: 1) flat against the membrane; or 2) one or two centimeters away from the membrane. The second preferred embodiment is particularly useful if an anion exchange membrane is used, as it provides space between the electrodes and membrane for denitrification to occur based on nitrates shuttling into the anode chambers.

In a particular embodiment, the anode electrode is constructed using carbon cloth material (Type B-1B, E-TEK) and is positioned flush against the membrane. This arrangement will allow for reduced internal resistance and increased current densities in the system as the distance between anode and cathode electrode pairings will be minimized. The volume of the cathode chamber is half filled with graphite granules with a graphite rod used as a current collector (Graphitesales Inc, EC 100).

Figure 3:
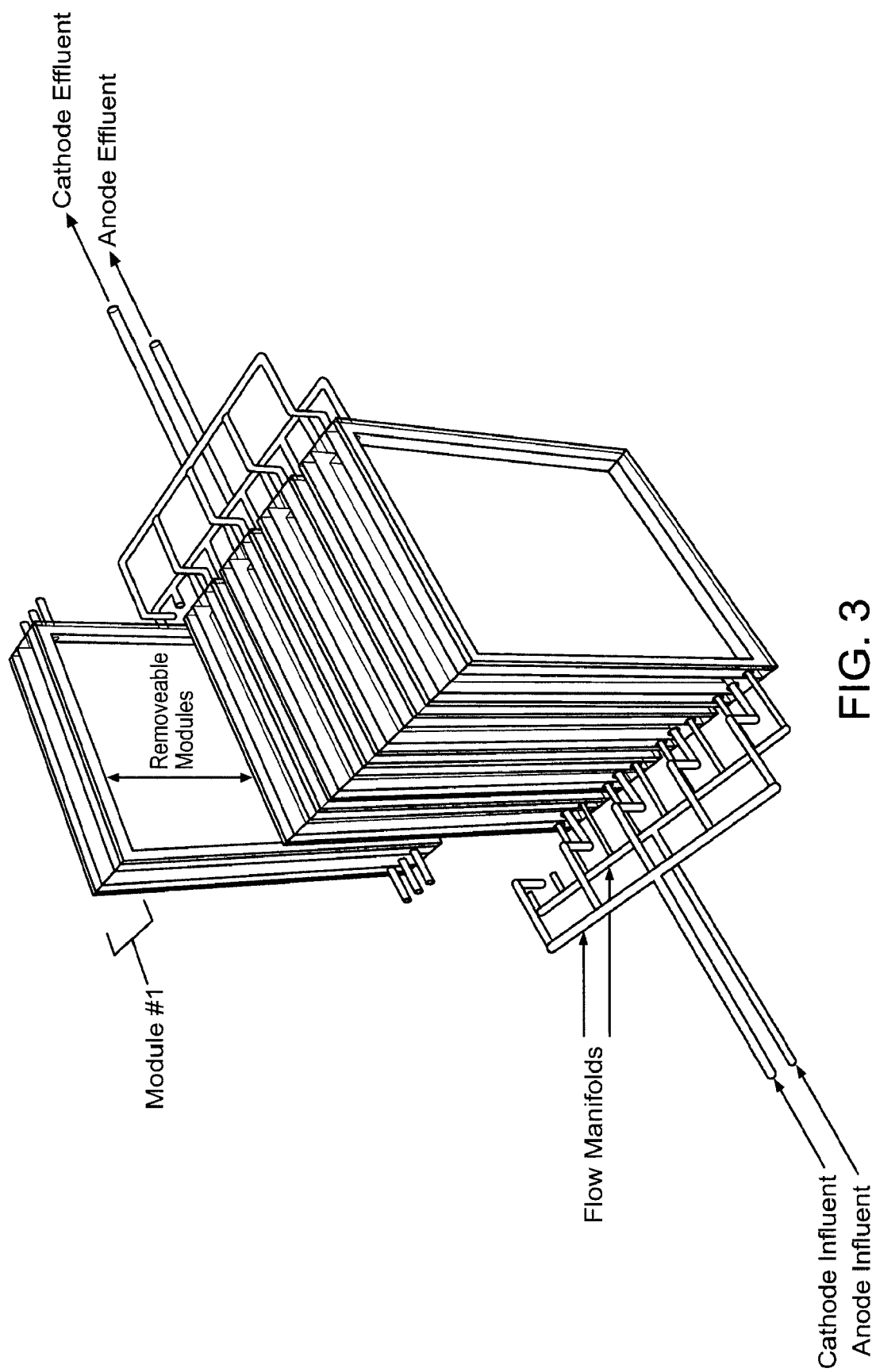
FIG. 3 depicts an exemplary embodiment of a bio-electrochemical system according to the invention that utilizes multiple, flat 3-electrode (e.g., anode-cathode-anode) modules.

An example of a denitrification BES according to the invention is depicted in FIG. 3. As shown in FIG. 3, the BES uses multiple three-chamber, flat modules. Each module has two anodes (outside) and one cathode (inside) (i.e., a cathode sandwiched by two anodes). The anode is used to oxidize COD and the cathode is used to reduce nitrates to nitrogen gas. The width of these chambers has a ratio of about 1:2:1 (anode:cathode:anode), for example 2 centimeters:4 centimeters:2 centimeters. The modules are separated by a permeable membrane (either anion exchange or cation exchange) that selectively allows ions to pass.

In certain embodiments, pre-treatment of wastewater streams may be necessary before feeding volumes into the reactors. As such, a pre-treatment tank can be coupled to the bio-electrochemical systems of the invention. Pre-treatment for the anode and cathode streams can be carried out separately using separate pre-treatment tanks. For example, in the embodiments where the reactors include multiple reaction modules, each of which include at least one anode and at least one cathode, a pre-treatment tank common to all anodes within the plurality of reaction modules or all cathodes within the plurality of reaction modules can be used. A splitting manifold can split the stream from each tank into each anode and/or cathode within the plurality of reaction modules, respectively.

Pre-treatment for the anode chamber can be without re-circulation so as to promote the settling of solids and anaerobic fermentation processes. Solids can therefore be removed from the bottom of this vessel without entering the BES system. The chamber for the cathode chamber can be a constantly mixed tank thus promoting complete nitrification of the influent stream.

The system can be operated with dynamic control the takes treatment rates, pH or other parameters as an input, and changes the operating characteristics such as flow rate, external resistance, or other parameters.

The system can be operated by poising potentials, particularly cathode potentials, at the optimal potential for COD removal or denitrification. The reduction potential for denitrification being close to that of oxygen ($NO_3^-/N_2$ at +0.74V versus +0.82V for $O_2/H_2O$), and poising the cathode at this potential would be suitable. One way to poise potentials economically is to measure the cathode potential against a reference electrode and then continuously and dynamically adjust the external resistance between the anode and the cathode so as to ensure the cathode potential stays as close to the desired potential as possible.

Separating Streams for the Combined Treatment of Carbon and Nitrogen Wastes from Industrial Facilities The present invention also provides a novel methods for the simultaneous treatment of nitrogenous (nitrogen-containing) waste components and reduced organic compounds, commonly measured as chemical oxygen demand (COD) or biological oxygen demand (BOD). The methods described herein take advantage of the existence of two separate treatment streams in most re-circulating and semi-re-circulating industrial facilities, such as aquaculture systems and wastewater treatment works. Typically, settling tanks increase the solids and BOD loading, anaerobic digesters will decrease the C:N ratio while aerobic systems will help remove ammonia via nitrification but they will also generate nitrates. In this context, however such systems are assembled, the stream higher in nitrates can be put through the cathode and the stream higher in BOD can be put through the anode. In some cases, the cathode can itself be oxygenated in some places, so that the chamber serves as a bio-air cathode while also nitrifying (see FIGS. 9A and 9B, each employing filtration membranes or porous separators). In some cases, the two chambers of the reactor can be used partially or primarily to increase or decrease the pH of the input stream, thereby reducing costs associated with pH management (as described in more detail below).

In many cases, industrial water treatment facilities will seek to de-nitrify the nitrate stream by using the high BOD stream as a carbon source. However, this is complex, often prone to failure, and results in a mixed stream which must be further treated. The present invention solves this by passing each stream separately through one chamber in a bio-electrochemical system (e.g. an anodic or cathodic chamber) and utilizes the unique properties of electrogenic organisms to simultaneous oxidize the BOD and reduce the nitrate. Several variants of this basic process can be conceived, including using the re-circulating tank itself as an anodic or cathodic chamber.

In certain aspects, the present invention provides bio-electrochemical systems and methods for the simultaneous treatment of BOD and COD using a bio-electrochemical system that includes at least one anode chamber or compartment and at least one cathode chamber compartment. A wastewater stream high in reduced organics (i.e., BOD) is flowed over the anodic electrode (i.e., the anodic waste stream), while a separate aquaculture wastewater stream high in nitrate is flowed over the cathodic electrode (i.e., the cathodic waste stream), thus providing a steady stream of chemical reactants for the oxidation and reduction reactions, respectively. A selective membrane allows protons to transfer from the anode to the cathode and provides charge balance for the electrons flowing to the cathode. The selective membrane also advantageously prevents the transference of other ions or microbes between the two streams.

Preparation of Waste Streams and Process Considerations

The anodic and cathodic waste streams may be collected or prepared in one of several ways. The anodic waste stream is generally higher in solids because these form a major component of the BOD in aquaculture effluent. Therefore one of several methods to separate or concentrate solids in the anodic waste stream may be employed, including but not limited to, mechanical filtration, a settling filter, a drum or canister filter or a centrifugation-based filter. The high BOD stream becomes the anodic stream, and may be used as is when it exits the primary separation system, or may be further altered for optimal use in the anodic chamber. One major consideration is the fact that high levels of oxygen in the anodic compartment prevent the electrode from being utilized by microbes as the terminal electron acceptor, so a system for removing the oxygen from the anodic stream may be employed. Such a system would include in-line oxygen concentration monitoring through the use of an oxygen probe, electrode or other device and a method for reducing the concentration of oxygen in the stream based on feedback from the monitoring system. This could take on several forms, including but not limited to: an oxygen absorbing resin or column; a system to sparge the waste stream with anaerobic gas to drive the oxygen out of solution; a pretreatment reactor designed to allow microbial growth or metabolism to use the oxygen in the stream before entering; or a combination of two or more such methods.

The cathodic waste stream may include, but is not limited to, one of the following: unfiltered culture water from one or more aquaculture tanks; effluent from nitrification reactors; and effluent from anaerobic digestion. In the case of effluent from anaerobic digestion, aeration may need to be nitrified before denitrification can occur. In these cases a bio-air cathode can be used in the nitrification portion of the cathode and a nitrate removing cathode can used afterwards. The anode input can include, but is not limited to, one or more of the following: the reduced-solids effluent from a mechanical filter, settling filter, drum filter or centrifugation filter, used to separate high BOD solids; or culture water while still inside the main aquaculture vessel. Oxygen can be detrimental to the cathodic reaction because it lowers the amount of nitrate that will be used for cathodic reduction, but is less detrimental than oxygen at the anode because it will not fundamentally alter the way that the cathodic reaction works, just the chemical species being reduced.

Figure 4A:
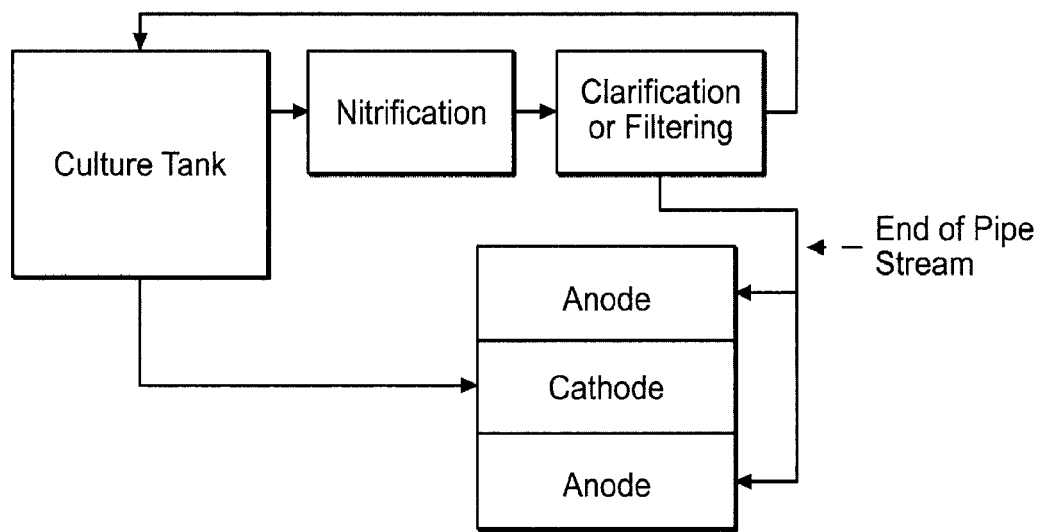
FIGS. 4A and 4B are flow diagrams depicting the treatment of separate streams from a single wastewater.
Figure 4B:
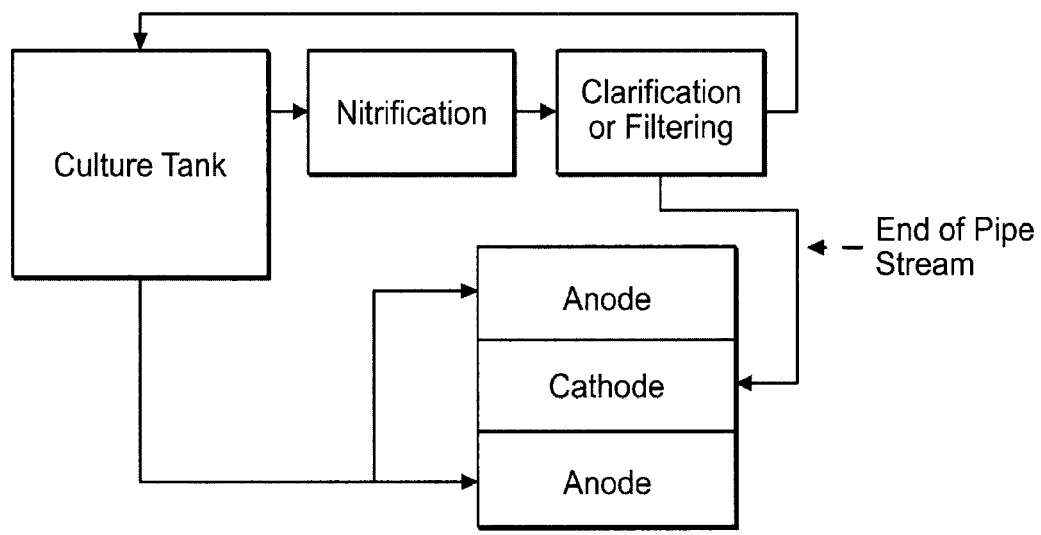

Reactor Architectures for Accommodating Separate Streams from Industrial Facilities The bio-electrochemical systems described herein can be used as a treatment reactor for the combined treatment of carbon and nitrogen wastes from industrial facilities, such as an aquaculture system, that is separate and distinct from the main aquaculture vessel. An example of the process design for RAS aquaculture in which the EOP stream is passed through the anode and the culture tank water is passed through the cathode is depicted in FIG. 4A. In the embodiment depicted in FIG. 4B, the process flow is similar to that depicted in FIG. 4A, however, as shown in FIG. 4B, the anode can be sandwiched by two cathodes.

Figure 5:
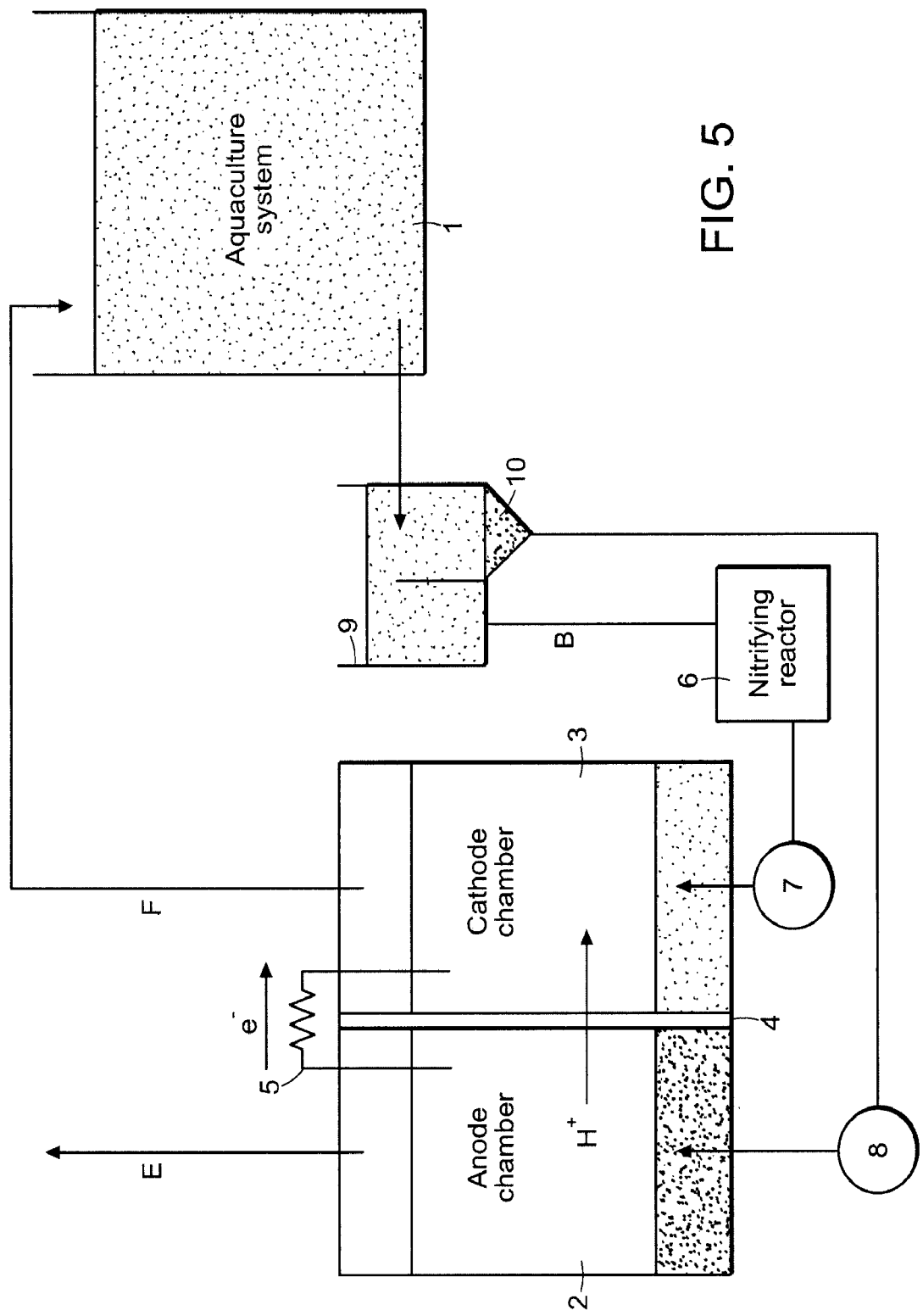
FIG. 5 is depicts the treatment of separate streams in an aquaculture context using an exemplary embodiment of a bio-electrochemical system according to the invention.

FIG. 5 depicts an exemplary embodiment of reactor architecture/components that can be used to co-treat nitrogenous and organic wastes from an aquaculture system 1 without mixing of streams once separated. As shown in FIG. 5, the system is configured to allow settling and clarification to occur before nitrification. The reactor shown in FIG. 5 includes an anode chamber 2, a cathode chamber 3, and a membrane 4 serving as a selective barrier between the two chambers that allows protons, but not water contaminants, to pass between the chambers. Each of the anodic and cathodic chambers (2 and 3, respectively) contains an electrode, or several electrodes, composed of one or more electrically conductive materials and generally with a large surface area for microbial attachment. Anodic and cathodic electrodes are connected to each other through external circuitry 5. Each of the anode chamber 2 and cathode chamber 3 also contains at least two ports or connections for fluid-containing tubes to be connected, and a path for liquid to traverse from one or more of the ports to one or more of the remaining ports; this path may be through a porous electrode material.

As shown in FIG. 5, water flows from the aquaculture system 1, to a separator 9 that includes a mechanism 10 to concentrate reduced organics (BOD) (e.g., a settling filter). In some embodiments, a nitrifying reactor 6 is employed upstream of the cathode chamber 3 to oxidize ammonia present in the waste to nitrate, which treats the toxic ammonia while also increasing the concentration of nitrate. Such a nitrifying reactor could also employ an oxygen sensor 7 to adjust the amount of oxygen available in the nitrifying reactor for aerobic ammonia oxidation to supply marginally more oxygen than is necessary to oxidize all of the ammonia, without introducing extra oxygen that would poison the cathodic reaction. A monitoring/feedback controller and/or $O_2$ scrubber system 8 can also be employed to ensure that the anode is anaerobic or anoxic.

As shown in FIG. 5, a liquid stream high in nitrate B flows from the aquaculture system 1 to a nitrifying reactor 6 to oxidize ammonia present in the waste to nitrate, and an oxygen sensor 7 to adjust the amount of oxygen available in the nitrifying reactor for aerobic ammonia oxidation, and into the cathode chamber 3. A separate liquid/solid stream C, which is high in BOD, flows from the aquaculture system 1 through a monitoring/feedback controller and/or $O_2$ scrubber system 8, and into the anode chamber 2.

In certain aspects, the present invention provides a treatment reactor for the combined treatment of carbon and nitrogen wastes from industrial facilities, such as an aquaculture system, where the cathodic electrode compartment is located within the main aquaculture vessel. Preferably, a sediment-like electrode material (e.g., graphite granules, graphite spheres or graphite cubes) is used. By creating a sufficient depth of graphite sediment for the cathodic electrode, oxygen will be depleted by microbial activity before it can diffuse to the bottom layers of the electrode material. Thus, ammonia can be oxidized to nitrite and then nitrate in the upper, aerobic sediment layer while the nitrate created will diffuse downward where it can be reduced to nitrogen gas and water by microbial activity by electrons donated from the electrode. A non-conductive layer of sediment may be included above the conductive sediment to prevent electrons from being used solely to reduce oxygen in the aerobic layer.

As previously described, instantiation, a proton exchange membrane can be used to separate the anode and cathode chambers while allowing proton mobility to the cathode. For example, the aquaculture vessel can contain a proton exchange membrane in a wall of the floor to allow for incorporation of the biotic cathode within an anoxic or anaerobic electrically conductive substrate, such as the cathodic electrode. As previously described, an oxygen monitoring and reduction system leading into the anode can be used to prevent the anodic reaction from being poisoned by oxygen.

In certain aspects the present invention provides a treatment reactor for the combined treatment of carbon and nitrogen wastes from industrial facilities, such as an aquaculture system, where the treatment reactor includes two biotic cathode chambers for increased versatility in managing aquaculture wastes (FIG. 6), with the anode chamber sandwiched between. Similar to the reactor architecture shown in FIG. 5, a liquid stream high in nitrate B flows from the aquaculture system 1 to a first nitrifying reactor 6a to oxidize ammonia present in the waste to nitrate and into the first cathode chamber 3a. A separate liquid/solid stream C, which is high in BOD, flows from the aquaculture system 1 through a monitoring/feedback controller and/or $O_2$ scrubber system 8, and into the anode chamber 2.

Figure 6:
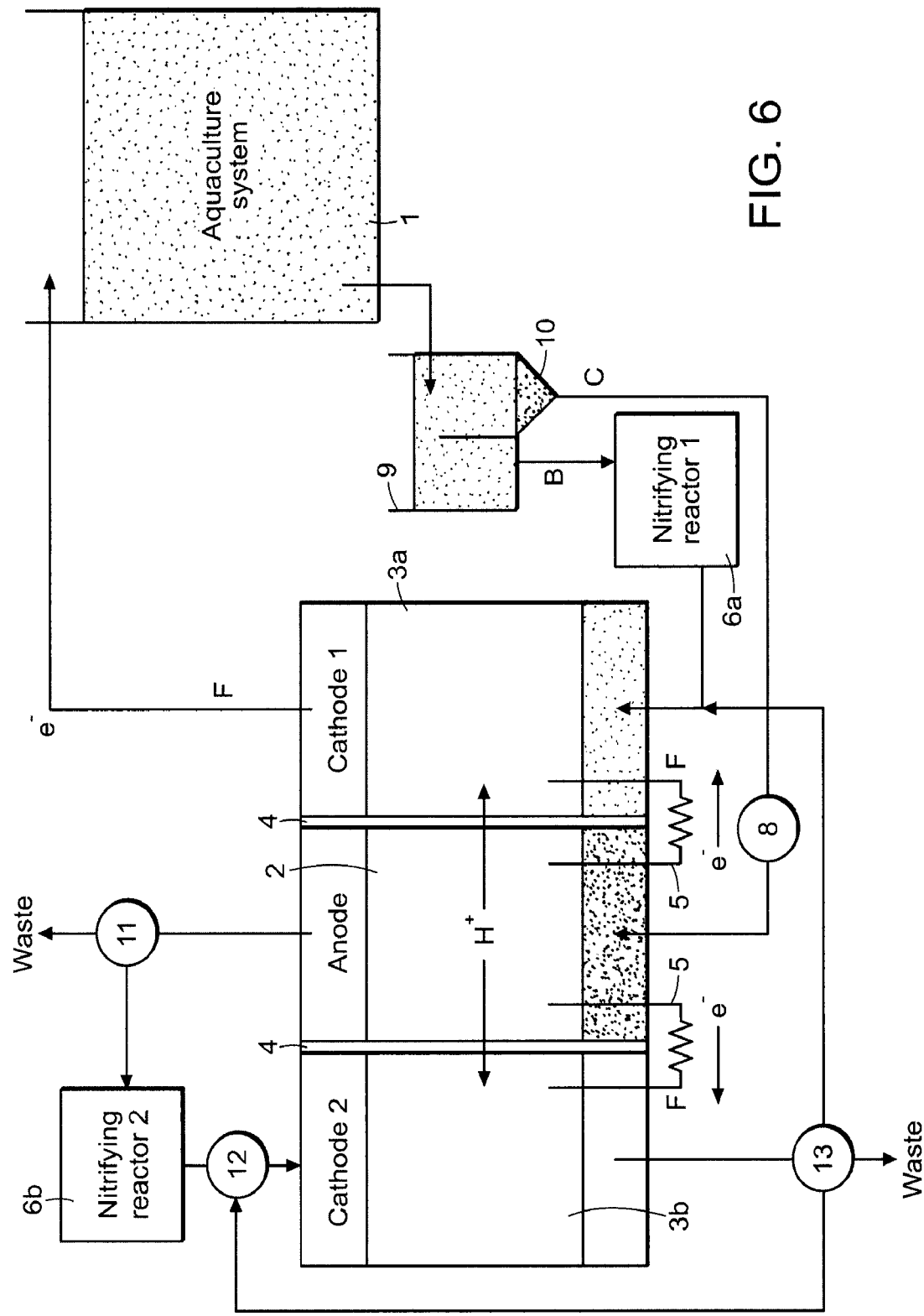
FIG. 6 depicts the treatment of separate streams from an aquaculture using an exemplary embodiment of a bio-electrochemical system according to the invention.

Ammonia may be present in both streams exiting the separator 9, and the anode reaction will generally not remediate substantial amounts of ammonia. To prevent dumping this to waste, a monitor 11 is present to divert anode effluent high in ammonia (or nitrate) to a second nitrifying reactor 6b for ammonia oxidation and then to the second cathode chamber 3b for nitrate oxidation (FIG. 6). A feedback system/control 12 for oxygen and effluent recirculating into the second cathode 3b can be disposed upstream the second cathode 3b. Depending on the concentration of nitrate entering the second cathode chamber 3b, it can be made anaerobic or somewhat aerobic by monitoring and controlling the amount and composition of air in the second nitrifying reactor 2b, and feedback system 12. Allowing some oxygen in the second cathode chamber 3b provides the anode 2 with a more rapid electron sink and could lead to increased BOD treatment rates without impacting the level of nitrate treatment in the first cathode 3a that recirculates to the aquaculture system 1. Since the cathode is generally limiting in microbial fuel cells, this dual cathode system could boost power output and treatment rates significantly. A monitor/valve 13 can be positioned downstream of the second cathode 3b to recirculate the second cathode effluent, dump to waste, or route to the first cathode 3a for additional treatment/reuse.

Figure 7A:
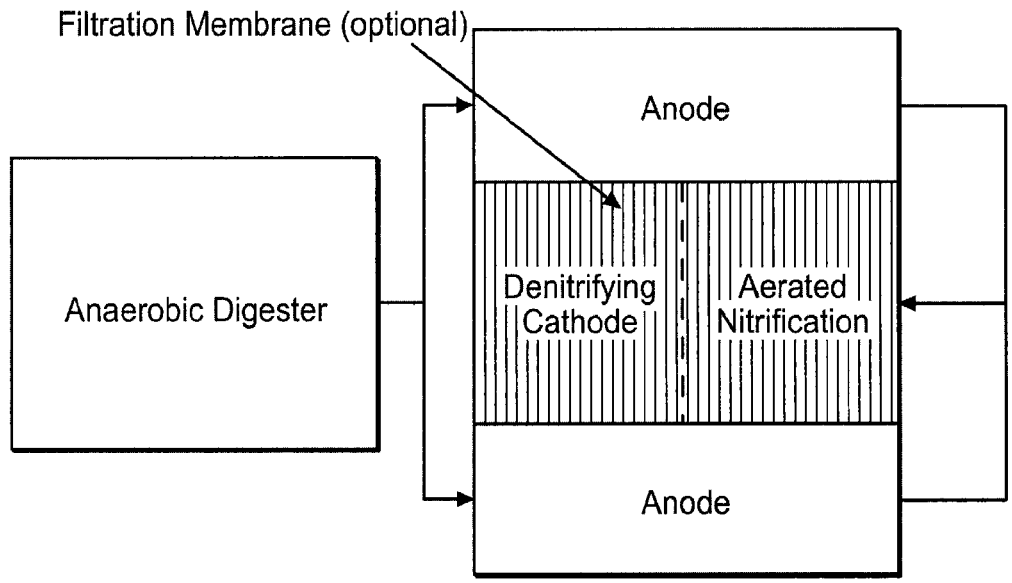
FIGS. 7A and 7B depict exemplary configuration of a bio-electrochemical system according to the invention coupled with an anaerobic digester.
Figure 7B:
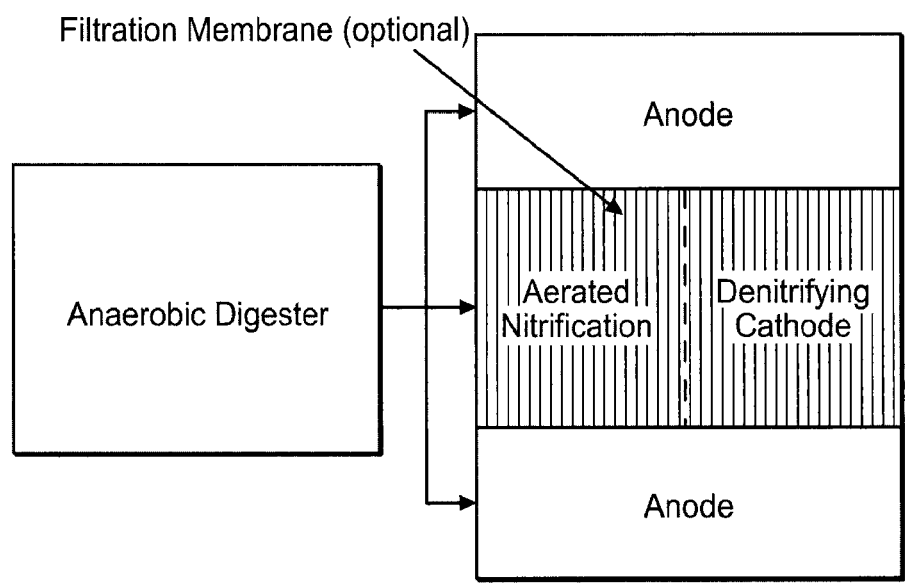

In some embodiments the BESs according to the invention can be placed after an anaerobic digester, or along side an anaerobic digester, with the purpose of removing nitrogen and/or nitrate while generating electricity. In this case the anode stream can be either the input to a primary clarify or the input to the anaerobic digester. Alternatively, the anode stream can be the output of the anaerobic digester. If the anode stream is the output of the anaerobic digester, ammonia oxidizing bacteria can be used in the anode chamber to help remove ammonia. A bio-air cathode can be used to remove residual ammonia, and a denitrifying cathode can be used to remove nitrates (see FIGS. 7A and 7B, embodiments in which the system is used as a polishing step for anaerobic digestion. Aeration is used to nitrify in a bio-air cathode and then cathode denitrification can occur).

In some embodiments, the BESs according to the invention can be placed after or alongside a nitrate concentrating system (e.g., electrodialysis) for the purpose of treating nitrates.

In another embodiment the system can be used to capture or remove $CO_2$ in biogas or otherwise. $CO_2$ produced at the anode can be bubbled into the cathode. The cathode microbes can use the $CO_2$ as a carbon source for growth or other reactions. Methane produced in an anaerobic digester can also be bubbled through the cathode, and the microbes will use the $CO_2$. In this case the biogas may or may not be purified or separated from the $CO_2$ in some way beforehand. Most generally bubbling biogas and/or $CO_2$ through a denitrifying reactor can be a way to remove or sequester $CO_2$ particularly if a bio-cathode is present to provide electrons.

In certain embodiments the reactor is operated with positive pressure from the cathode to the anode, so that the nitrate laden stream is always pushed into the anode in the event of any membrane tears or breaches.

pH Management

Denitrification for the removal of the toxic ammonia results in a decrease in the pH of the culture water. Typically, this acidification must be countered with the addition of alkalinity through the use of caustic and/or carbonate. Denitrification treatment technologies will generally mitigate the requirement for pH adjustment, although the exact degree depends on the method and carbon source used. Thus, an important feature of a denitrification used for aquaculture wastewater treatment is a reduction in the amount of pH correction required.

The BESs described herein can be used to remove COD (anode), nitrate (cathode) and also improve pH quality in process waster and wastewater. The system can therefore operate at a maximum rate for nitrate removal, COD removal, or pH management depending on the exact needs. For example, a hydraulic retention time (HRT) suitable for optimizing pH might be used and in that case, only partial de-nitrification and partial COD removal favored. This depends on the economics of the site in question.

Figure 8:
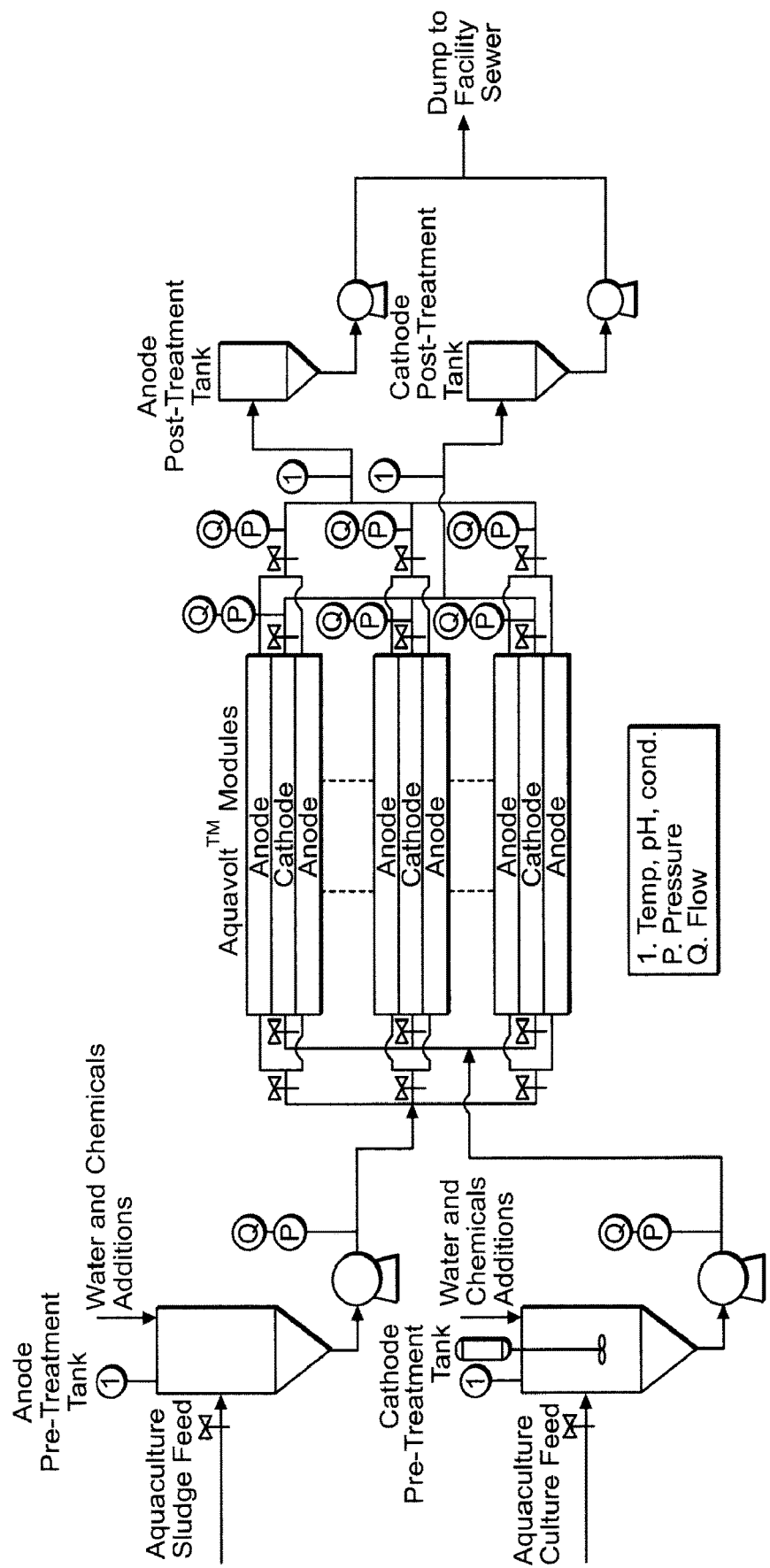
FIG. 8 is a flow diagram of a proposed wastewater treatment system layout utilizing an exemplary embodiment of a bio-electrochemical system according to the invention.

In certain embodiments, the influent for the reactors originate from two separate streams from the onsite aquaculture tanks or related facilities. These streams can run into separate holding tanks (e.g., 1,000 L each), allowing for a HRT of around 60 hours. This allows for monitoring of pH, temperature, conductivity, COD and nitrate concentrations. If required, this also allows for pre-treatment before being fed into a BES according to the invention. The anode(s) and cathode(s) can be pre-treated separated (see e.g., FIG. 8). The pre-treatment tank for the anode chambers can be left without mixing in order to promote anaerobic fermentation processes, to help optimize performance of the anodic electrogenic biofilm. The cathode pre-treatment tank can be mixed to promote the complete nitrification of the stream and the generation of an anaerobic environment suitable for denitrification. Pumps are used to transfer the monitored solution from the tanks to the reactor chambers. Injection ports and mixing segments can be installed in the influent lines to allow for nutrient and acid dosing.

In certain embodiments, the BESs described herein include a blowdown tank large enough to hold the waste streams over 60 hours in order to be properly treated before being returned to the waste disposal stream. Lines can be installed to feed the cathode effluent back to the aquaculture tank recirculation lines.

Ancillary Systems Design

Solids Handling. Solids are known to be a critical issue for biological reactors, including BES-based technologies. The BESs according to the invention can include safety measures to deal with solids. For example, a grit strainers and/or a flow-through filtration unit can be employed. In such embodiments, before entering the pre-treatment tank the influent streams travel through grit strainers and a flow-through filtration unit to remove large solids.

In certain embodiments, the BESs according to the invention can also be designed to include a backflow purge to wash out solids accumulating inside the reactor. For example, pressure gauges can be installed on the inlets and outlets of all pumps and reactors. Removable view-pipes can also be installed to observe solids buildup.

Pre-Treatment. In certain embodiments, pre-treatment of wastewater streams may be necessary before feeding volumes into the reactors. Pre-treatment for anode and cathode chambers can be carried out separately. Pre-treatment for the anode chamber can be without re-circulation so as to promote the settling of solids and anaerobic fermentation processes. Solids will be removed from the bottom of this vessel without entering the BES system. The chamber for the cathode chamber can be a constantly mixed tank thus promoting complete nitrification of the influent stream.

In certain embodiments, the BES systems of the invention include pre-treatment tanks that are hold enough volume for several days of operation (e.g., 1,000 L in volume). With such a large volume, temporal changes in the source volume will be minimized. The pre-treatment tanks facilitate normalizing pH, temperature, COD, nitrate, and other nutrients critical for operation. Once prepared, pumps can be utilized to transfer the volumes to the reactors.

System Connectivity (Tie-In Locations). The BESs according to the invention can be designed with ease of connection as a high priority. Hoses can be used to transfer volumes between the pre-treatment tanks and reactors, or other process units. In particular, cam-and-groove couplings can be used to allow for quick connections during operation and allow for flexible placement of units. Using hoses with couplings is an advantage as opposed to hard-line cemented PVC since flexibility is achieved by the reactor design described herein. This will allow the reactors to be placed in series or separated entirely for different scenarios and/or applications.

Sampling Access. Water sampling is oftentimes necessary for analyzing the performance of the reactor. The BESs described herein can include water sampling access points along various locations in the system. For example, the system can be designed to allow for water samples to be taken from the pre-treatment tank during preparation, continuously from the reactor at the input, output, and a number of locations along its length.

Automated Data Collection. Each of the parallel systems can be independently run by a multichannel I/O programmable logic controller. This controller can be used to control the pumps, collect temperature, pH, reference electrode, COD, and nitrate, conductivity, and pressure readings, and relay the data over the internet to a remote data server. Supervisory Control & Automated Data Acquisition (SCADA) capabilities can also be included are envisioned within the scope of the present invention.

Power Management System. The BESs according to the invention are preferably run at low resistance in order to maximize current. However, in larger scale systems when power must be used, power management systems can be used to up-convert the low voltage (~0.25V) to the necessary higher voltages for process units.

Gas Handling. Gas production from the cathode is expected to be approximately 1 scf/day (based on denitrification rates) with similar rates expected from the anode. No processing of the produced gases is necessary. Gas produced in the cathode of the reactor (principally $N_2$) will rise to the top and be purged through a gas trap and released. Gas flow can be quantified with a gas rotameter and purged to the exterior of the reactor. Gas from the anode is primarily $CO_2$, however methane and hydrogen sulfide can also be produced. This gas will also be vented to the exterior following collection and metering. Exact venting requirements can be evaluated during process safety review. Gas sampling locations can be included following gas traps so the composition may be periodically monitored.

Hydraulic Analysis and Design. Pressure gauges and flow meters can be installed at critical points in the system, with pressure-maintaining release valves and rupture discs, to facilitate observation of pressure and flow in the reactors.

The invention having now been described by way of written description, those of skill in the art will recognize that the invention can be practiced in a variety of embodiments and that the foregoing description and examples below are for purposes of illustration and not limitation of the claims that follow.

EXAMPLES

The following examples, including the experiments conducted and results achieved are provided for illustrative purposes only and are not to be construed as limiting upon the present invention.

Example 1

Cathodic Nitrogen Removal in Bio-Electrochemical Systems

The ability of bio-cathodes to play a role in nitrogen cycling, particularly denitrification, was first shown to occur on the cathode of a sediment microbial fuel cell. The reduction potential for denitrification being close to that of oxygen ($NO_3^-/N_2$ at +0.74V versus +0.82V for $O_2/H_2O$) indicated it would be suited for application in a BES. The use of a pure culture isolate (*Geobactermetallireducens*) or enriched microbial cultures verified that electrodes serve as the sole electron donors for nitrate reduction to nitrite and nitrate reduction to nitrogen gas. The combination of BOD removal and denitrification was demonstrated in complete microbial fuel cell systems operating with biological cathodes. An advancement of this process demonstrated a combined BOD/denitrification BES process, operated with simultaneous nitrification and denitrification. This achieved increased yields of 2 kg $COD/m^3$ day, 0.41 kg $NO_3$—$N/m^3$ day, with a current generation of 34.6 $W/m^3$. A COD/N ratio of approximately 4.5 g COD/gN was achieved, as compared to the typical requirement ratio of 7. Optimization of the cathodic electrode potential can result in increased current production. This is particularly evident in the potential range of +0.050 to −0.030 V vs SHE, where a steep increase of the current was shown. Catholyte pH regulation has been identified as a key factor for complete denitrification; by maintaining the catholyte pH at 7.2, nitrogen removal rates were shown to increase from 0.22 to 0.50 kg $NO_3$/day.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes. The invention having now been described by way of written description, those of skill in the art will recognize that the invention can be practiced in a variety of embodiments and that the foregoing description and examples below are for purposes of illustration and not limitation of the claims that follow.

What is claimed is:

1. A bio-electrochemical system for treating a plurality of incoming streams of wastewater comprising:
one or more pre-treatment tanks for receiving and pre-treating the plurality of incoming streams of wastewater;
at least one removable reaction module configured to receive one or more of the plurality of incoming streams of wastewater and comprising:
a flat, substantially conductive electron donating structure sandwiched between two flat, substantially conductive electron accepting structures arranged in succession and in substantial proximity to each other and a selectively permeable membrane bordering each of the flat, substantially conductive electron donating structures and each of the two flat, substantially conductive electron accepting structures, or
a flat, substantially conductive electron accepting structure sandwiched between two flat, substantially conductive electron donating structures arranged in succession and in substantial proximity to each other and a selectively permeable membrane bordering each of the flat, substantially conductive electron accepting structures and each of the two flat, substantially conductive electron donating structures,
wherein one or more of the electron accepting or electron donating flat, substantially conductive structures are coated with at least one microbial biofilm, and the at least one removable reaction module is configured to separately and substantially simultaneously flow one or more of the plurality of incoming streams of wastewater over the electron donating structures and one or more of the plurality of incoming streams of wastewater over the electron accepting structures, and a controller connected to the flat substantially conductive electron accepting and donating structures for controlling operation and for sending system data to a remote server.

2. The bio-electrochemical system of claim 1, wherein one of the plurality of incoming streams of wastewater contains a chemical oxygen demand (COD) and one of the incoming streams of wastewater contains nitrogenous waste.

3. The bio-electrochemical system of claim 2, wherein the system further comprises a nitrifying reactor for pre-treating the incoming stream of wastewater containing the nitrogenous waste.

4. The bio-electrochemical system of claim 1, wherein at least a portion of an effluent from the at least one removable reaction module is configured to be returned to the system.

5. The bio-electrochemical system of claim 1, wherein one or more of the flat, substantially conductive electron accepting structures arranged in succession or the sandwiched flat, substantially conductive electron accepting structure comprises an air cathode.

6. The bio-electrochemical system of claim 1, wherein the system comprises a plurality of the at least one removable reaction module.

7. The bio-electrochemical system of claim 6, wherein two or more of the at least one removable reaction module are interchangeable.

8. The bio-electrochemical system of claim 1, wherein the flat, substantially conductive electron accepting and/or donating structures comprise one or more materials selected from the group consisting of carbon cloth, carbon mesh, activated carbon, graphite granules, charcoal, biochar, stainless steel, and a solid support structure coated with a conductive material.

9. The bio-electrochemical system of claim 8, wherein the solid support structure is made of plastic and the conductive material is carbon paint or carbon epoxy.

10. The bio-electrochemical system of claim 1, further comprising at least one power source configured to apply a voltage to the at least one removable reaction module.

11. The bio-electrochemical system of claim 10, wherein the at least one power source is configured such that the voltage applied to the at least one reaction module is variable.

12. The system of claim 1, wherein the controller further monitors and optimizes one or more levels of a: voltage, resistance, electrode spacing, fuel loading rate, pH of fuel, biochemical biological oxygen demand, chemical oxygen demand, nitrate, ammonia concentration, and other chemical species concentration.

13. The bio-electrochemical system of claim 2, wherein the system further comprises an anaerobic digestion reactor for pre-treating one of the plurality of incoming streams of wastewater.

14. The bio-electrochemical system of claim 1, wherein the one or more pre-treatment tanks are configured to separate one of the plurality of incoming streams of wastewater into at least a first stream comprising solid organic compounds and a second stream comprising ammonia and nitrates for separately feeding the flat, substantially conductive electron donating and accepting structures.

15. The bio-electrochemical system of claim 1, wherein one stream of the plurality of incoming wastewater streams is an output of the removable reaction module.

* * * * *